United States Patent [19]

Hurta et al.

[11] Patent Number: 5,686,920
[45] Date of Patent: *Nov. 11, 1997

[54] TRANSPONDER MAINTENANCE MODE METHOD

[75] Inventors: Dwaine S. Hurta, Garland; Francis B. Frazee, Plano, both of Tex.

[73] Assignee: Texas Instruments Incorporated, Dallas, Tex.

[*] Notice: The term of this patent shall not extend beyond the expiration date of Pat. No. 5,525,994.

[21] Appl. No.: 482,350

[22] Filed: Jun. 7, 1995

Related U.S. Application Data

[63] Continuation of Ser. No. 233,169, Apr. 26, 1994, Pat. No. 5,450,087.

[51] Int. Cl.$^6$ .................................................. G01S 13/76
[52] U.S. Cl. .................... 342/42; 342/44; 342/51
[58] Field of Search ................... 342/42, 44, 50, 342/51

[56] References Cited

U.S. PATENT DOCUMENTS

| | | | |
|---|---|---|---|
| 4,338,587 | 7/1982 | Chiappetti | 340/32 |
| 4,588,880 | 5/1986 | Hesser | 235/376 |
| 4,827,395 | 5/1989 | Anders | 364/138 |
| 4,888,591 | 12/1989 | Landt et al. | 342/44 |
| 4,912,471 | 3/1990 | Tyburski et al. | 342/42 |
| 5,053,774 | 10/1991 | Schuermann et al. | 342/44 |
| 5,086,389 | 2/1992 | Hassett et al. | 364/401 |
| 5,128,669 | 7/1992 | Dadds et al. | 340/901 |
| 5,144,314 | 9/1992 | Malmberg et al. | 342/44 |
| 5,144,553 | 9/1992 | Hassett et al. | 364/401 |
| 5,164,732 | 11/1992 | Brocklesby et al. | 342/44 |
| 5,196,846 | 3/1993 | Brocklesby et al. | 340/993 |
| 5,253,162 | 10/1993 | Hassett et al. | 364/405 |
| 5,448,242 | 9/1995 | Sharpe et al. | 342/42 |
| 5,450,087 | 9/1995 | Hurta et al. | 342/42 |
| 5,450,088 | 9/1995 | Meier et al. | 342/51 |
| 5,457,461 | 10/1995 | Schuermann | 342/42 |
| 5,471,212 | 11/1995 | Sharpe et al. | 342/51 |
| 5,488,376 | 1/1996 | Hurta et al. | 342/42 |
| 5,517,194 | 5/1996 | Carroll et al. | 342/50 |
| 5,525,991 | 6/1996 | Nagura et al. | 342/42 |
| 5,525,992 | 6/1996 | Froschermeier | 342/42 |
| 5,525,994 | 6/1996 | Hurta et al. | 342/51 |

FOREIGN PATENT DOCUMENTS

| | | |
|---|---|---|
| 0 401 192 | 5/1990 | European Pat. Off. ........ G08B 1/123 |
| 29 19 753 | 5/1979 | Germany . |
| 2 299 701 | 11/1980 | Germany . |

*Primary Examiner*—John B. Sotomayor
*Attorney, Agent, or Firm*—Rebecca A. Mapstone; James C. Kesterson; Richard L. Donaldson

[57] ABSTRACT

A method and system is provided for communicating permanent or semi-permanent information to a transponder (14) from an interrogator (12), preferably operated by a toll agency or other authorized entity. This permanent or semi-permanent information is communicated by means of special instructions valid only during a special mode or maintenance mode which is entered by transmitting a special access code to the transponder (14) from the authorized interrogator (12). The transponder (14) will preferably acknowledge to the authorized interrogator (12) that it is, in fact, operating in the maintenance mode so the interrogator (12) can transmit the special instructions in confidence.

12 Claims, 8 Drawing Sheets

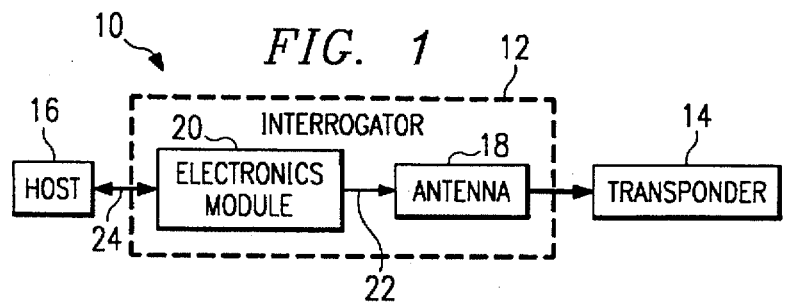
FIG. 1
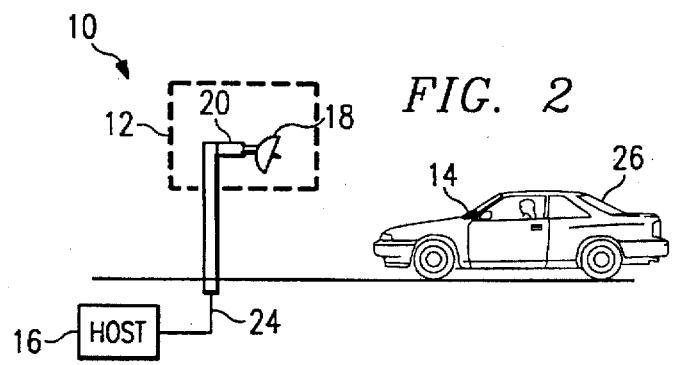
FIG. 2
FIG. 3
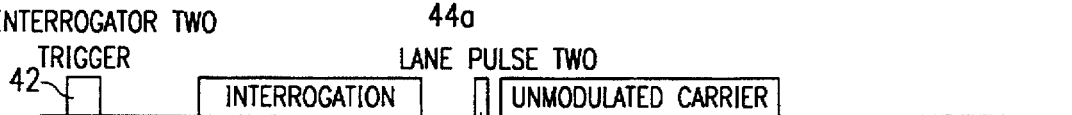
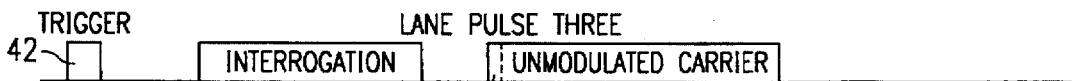

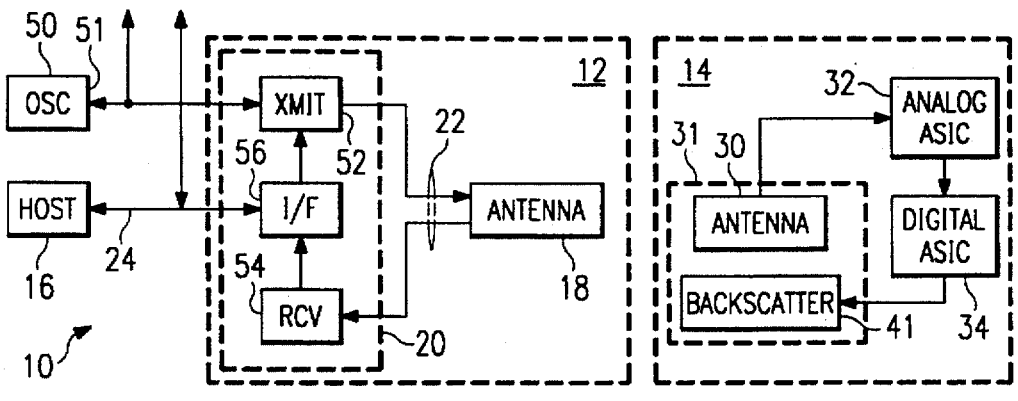
FIG. 4
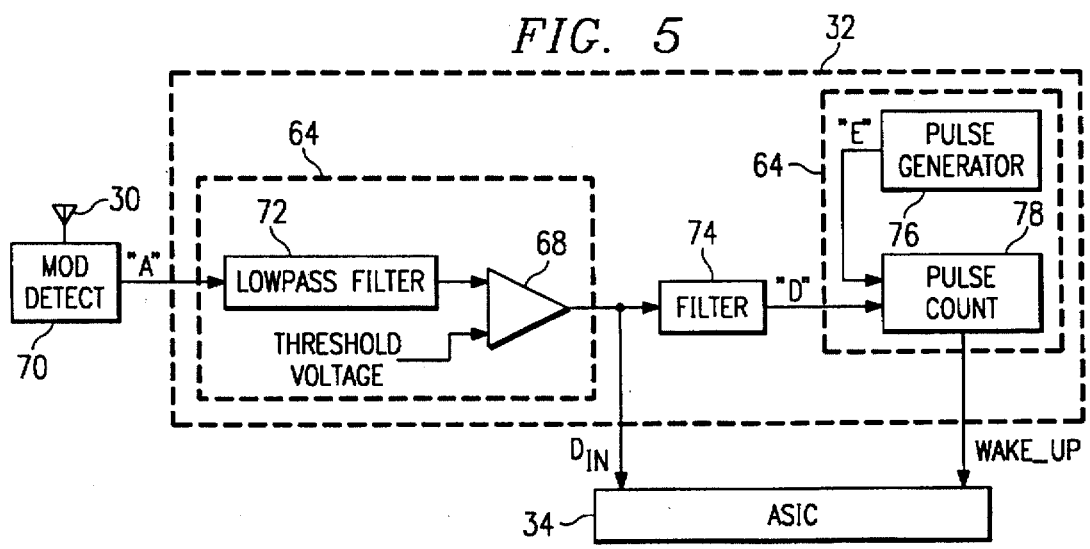
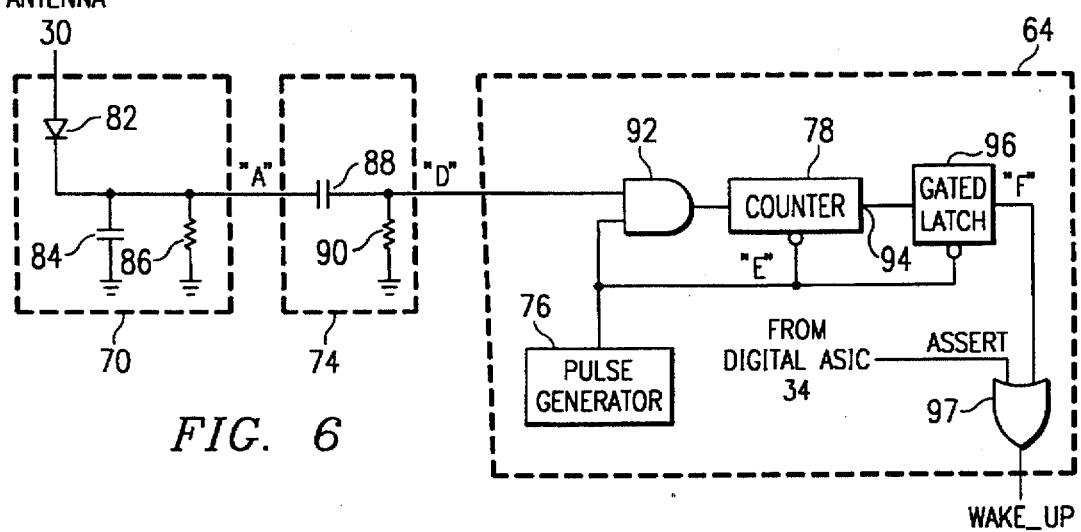
FIG. 6

1

TRANSPONDER MAINTENANCE MODE METHOD

This is a continuation of application Ser. No. 08/233,169, filed Apr. 26, 1994 now U.S. Pat. No. 5,450,087.

CROSS-REFERENCE TO RELATED PATENTS

The following commonly assigned patent applications are hereby incorporated herein by reference:

| U.S. Pat. No. /Ser. No. | Filing Date | TI Case No. |
| --- | --- | --- |
| 5,053,774 | 2/13/91 | TI-12797A |
| 07/981,635 | 11/25/92 | TI-16688 |
| 08/021,123 | 2/23/93 | TI-17529 |

FIELD OF THE INVENTION

This invention generally relates to recognition systems of the type which include an interrogator and a transponder, and more particularly to such a system in which the interrogator transmits an interrogation signal to the transponder in response to which the interrogator transmits back to the interrogator a response signal. The invention further generally relates to improved methods of communicating between the interrogator and the transponder. In specific embodiments, the invention relates to an Automatic Vehicle Identification (AVI) type of recognition system.

BACKGROUND OF THE INVENTION

The invention will be described in the context of an Automatic Vehicle Identification (AVI) system capable of exchanging data codes between an interrogator and a transponder. The AVI field is but one environment in which the inventive concepts described herein can be applied. Systems using batteryless transponders or transponders with batteries may be used for identifying or locating objects bearing the transponders such as cattle, luggage or other items. Further, a transponder might provide status information regarding the object on which it is located, such as a transponder born on a car door indicating whether that car door is open. Transponders utilized in the above recognition systems or others may be powered from batteries or from wireless radio frequency (RF) signals.

With respect to AVI systems, generally, the interrogator is provided in a toll booth of a toll road, parking garage or other limited access facility. The interrogator (reader) identifies passing automobiles by sending wireless interrogation signals to a transponder (tag), which would normally be a small, self-contained unit placed, for example, on the dashboard or windshield of the car. In this way the car (or other vehicle or object) can be identified in a speedy and efficient manner. Depending on the use of the system, an account associated with the driver, owner, or other designated person can be debited with an access charge. Compatibility standards for one such AVI system is set out in Title 21, Division 2, Chapter 16, Articles 1–4 of the California Code of Regulations, herein known as the Caltrans specification or Caltrans spec.

With respect to the specific embodiment, which is compatible with the Caltrans spec, the minimum role of the interrogator is to: 1) trigger or activate a transponder; 2) interrogate the transponder for specific information; and 3) provide an acknowledgement message to the transponder after a valid response to the interrogation has been received. The immediate mandate of the Caltrans spec covers electronic toll collection, sometimes described as a part of "Electronic Tolls and Traffic Management" (ETTM). The AVI equipment for toll collection will typically consist of two functional elements: vehicle-mounted transponders and fixed-position interrogators.

A toll collection site will consist of at least one interrogator operating in the role described above. Upon interrogating or "polling" the transponder for specific information such as a transponder identification (ID), the interrogator (or a separate computer) will typically check the transponder ID against a database of valid, non-delinquent accounts. If the transponder ID is valid and non-delinquent, the interrogator will send a signal to a gate mechanism, or a toll site computer operating such a gate mechanism, to allow the car to pass. Of course other enforcement means are possible that may allow for less interruption of traffic, such as allowing all cars to pass and identifying the auto carrying the transponder (or the rogue automobile carrying an inoperable transponder or no transponder at all) by other means and notifying an appropriate enforcement agency.

The interrogation signal and response signal comprise data codes. Caltrans spec has set forth definitions for data codes to be transmitted between the interrogator and the transponder. The data codes described below are derived from the Caltrans specification and are merely exemplary and are intended to be neither an exhaustive nor a mandatory list of codes for a general AVI system.

(a) Agency Code: This 16-bit code field identifies the Agency that has authority to conduct the transaction;

(b) Error Detection Code: The error detection code may be CRC-CCITT-16, with a generator polynomial of $X^{16}+X^{12}+X^5+1$. This results in a 16-bit error detection code transmitted with each data message;

(c) Header Code: The Header is generally the first field in each data message for either reader or transponder transmissions and consists of an 8-bit and a 4-bit word for a total of 12 bits. The Header provides a "selsyn" signal that may be used by a receiver within a transponder or interrogator to self-synchronize (selsyn) with the data being received from the interrogator or transponder, respectively. An exemplary selsyn signal might the binary and hexadecimal values: 10101010 and AA, respectively.

(d) The Header Flag code provides for a unique, 4 bit Flag that is recognized by a transponder or interrogator decoder as the end of the Header with the data message to follow. The exemplary Flag signal has binary and hexadecimal values: 1100 and C respectively;

(e) Interrogator ID Number: This 32-bit field is used to uniquely identify the interrogator conducting the transaction;

(f) Transaction Record Type Code: This 16-bit code uniquely identifies a specific type of valid transaction between a reader and a transponder. This code uniquely defines the transponder message fields and functions permissible. By way of example, hexadecimal numbers 1 through 7FFF may be set aside for transponder message structures and 8000 through FFFF may be dedicated for reader-to-transponder message structures;

(g) Transaction Status Code: Used to provide status information to the transponder; and (h) Transponder ID Number: This 32-bit code uniquely identifies which transponder is responding to a polling request or is being acknowledged.

Because the transponders typically either derive their operating power from a small battery, or from a received RF signal, the transponders are not normally active. The interrogator will transmit an RF trigger pulse to activate (turn-on) the transponders in approaching cars or other objects. The interrogator may transmit a number of RF trigger pulses at regular intervals to wake up any approaching transponders. Alternatively, the interrogator might send an RF trigger pulse in response to an external stimulus to the interrogator indicating that a transponder is approaching (e.g. light, heat, or magnetic sensors). After a time delay, the reader then will transmit an encoded signal, referred to as the Polling message or interrogation which, upon detection and decoding by the transponder, will provide initial information to the transponder as to which data blocks the transponder should transit.

In a described embodiment, the interrogator transmits an unmodulated continuous wave RF signal as an interrogation signal to the transponder while waiting for the transponder response signal. By analogy to acoustic signals, an unmodulated RF signal is similar to a constant or "pure" musical tone without any variation in amplitude or frequency. However, it should be mentioned that a signal could be considered "unmodulated" in amplitude even if varying in frequency and vice versa. The transponder response signal in this embodiment comes when the transponder backscatter modulates the continuous wave RF signal with information from the transponder. Following the acoustic analogy, backscatter modulation is similar to the phenomenon achieved by singing into a fan and listening to the resulting sound. Typically when a person sings, they control the variations or modulations of their voice. Similarly, an RF transmitter is generally able to modulate its signal. However, when a person sings into a fan, the blades of the fan will reflect the sound of the voice immediately back to the person when the blades pass immediately in front of his mouth. Thus, the singer hears a chopping sound superimposed on his voice. That "chopping" sound the singer hears is nothing more than the amplitude variation of the reflection of the sound of his voice. Similarly, the transponder can modulate (by amplitude or other means) the continuous wave RF signal received from the interrogator and this reflected signal will have modulations superimposed on it.

SUMMARY OF THE INVENTION

A method and system is provided for communicating permanent or semi-permanent information to a transponder from an interrogator, preferably operated by a toll agency or other authorized entity. This permanent or semi-permanent information is communicated by means of special instructions valid only during a special mode or maintenance mode which is entered by transmitting a special access code to the transponder from the authorized interrogator. The transponder will preferably acknowledge to the authorized interrogator that it is, in fact, operating in the maintenance mode so the interrogator can transmit the special instructions in confidence.

In the preferred embodiment of the present invention within a vehicle travelling on a vehicle lane is a transponder. The transponder receives the interrogation signal from the transmitter of the interrogator and can reply to the interrogator by backscatter modulating a continuous wave input from the interrogator or another source. The receiver of the interrogator then decodes the backscatter modulated signal and may relay the information contained in this signal to a control circuit which, for example, might log the information into a memory. A number of transponders can be polled separately by interrogators associated with each vehicle lane.

The principles described in connection with this invention can be applied toward non-AVI systems as well as AVI systems. For example, the power saving principles described herein could be used with the inventions of commonly assigned U.S. Pat. No. 5,053,774 and U.S. patent application Ser. No. 08/021,123.

BRIEF DESCRIPTION OF THE DRAWINGS

In the drawings:

FIG. 1 is a block circuit diagram of an interrogator and transponder arrangement according to the present invention;

FIG. 2 is a generalized side elevation of a typical installation of an Automatic Vehicle Identification (AVI) System in accordance with FIG. 1;

FIG. 3 is a generalized top view of three adjacent traffic lanes using the AVI System of FIG. 1, the figure including a depiction of the timing sequence of a trigger pulse and interrogation signal from the interrogator to the transponder;

FIG. 4 is a block circuit diagram of the transponder and interrogator arrangement usable in the systems of FIGS. 1–3;

FIG. 5 is a more detailed block circuit diagram of the transponder of FIG. 4, depicting a modulation detector, a highpass filter, and a wake-up block;

FIG. 6 is an even more detailed block circuit diagram of the elements of FIG. 5, including the modulation detector, the highpass filter and the wake-up block;

Corresponding numerals and symbols in the different figures refer to corresponding parts unless otherwise indicated.

DETAILED DESCRIPTION

Figure 7:
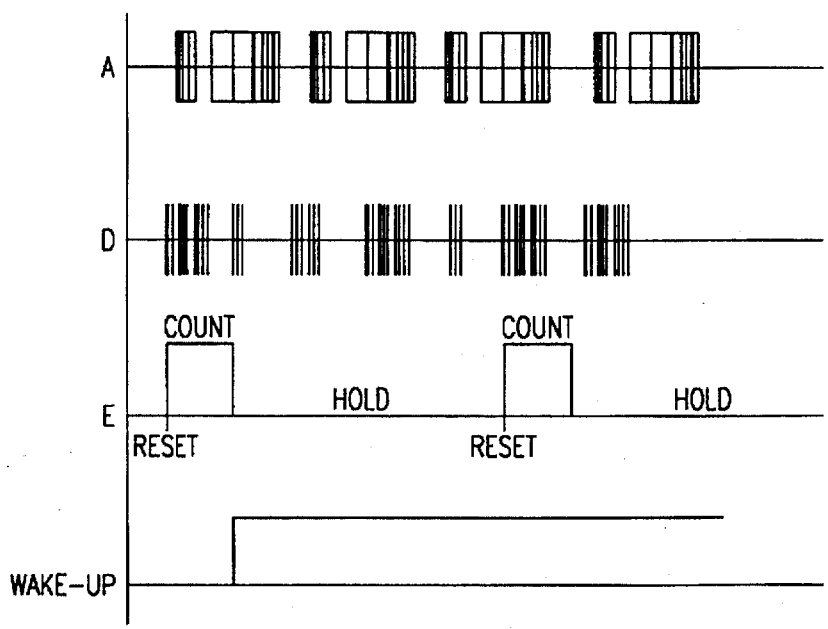
FIG. 7 is a timing diagram showing the signals at labeled nodes of the transponder as shown in FIGS. 5–6.

FIG. 1 shows a block diagram of an AVI system 10 in which an interrogator 12 communicates with a remote transponder 14 by transmitting an interrogation signal to the transponder 14 in response to which the interrogator 12 transmits back to the interrogator 12 a response signal containing a transponder-unique identifying code (ID). In a typical AVI system, the interrogator 12 will convey this ID code into a host computer (host) 16 for debit against the driver's account. The AVI system 10 preferably includes interrogator electronics 20 for control of the interrogator 12.

Referring to FIGS. 2 & 3, multiple traffic lanes 28 are located at a traffic control point such as a toll plaza 29. Each traffic lane 28 has an associated interrogator 12. The interrogator 12 maintains communication via an RF data link with transponders 14 carried on vehicles 26 travelling within the interrogator's 12 associated lane 28. The interrogators 12 may have unique internal electrical parameters such as interrogator lane position, interrogator control parameters, and interrogator reference frequency. The role of the interrogator 12 in this application is: to trigger or activate a transponder 14, to interrogate or poll the transponder 14 for specific information, and to acknowledge to the transponder 14 that a valid data exchange has taken place. As shown in FIGS. 1–3, the interrogator 12 has an antenna 18 which is preferably mounted approximately 18 feet above the ground. Preferably, the antenna 18 will have circular polarization, but advantages may exist which will motivate the use of other choices of polarization including linear and elliptical. Interrogator electronics 20 are connected to the antenna 18 by suitable cable, such as for example an RF coax 22.

The interrogator 12 communicates in a wireless fashion with the transponder 14 by sending on/off keyed modulated signals to the transponder 14. Interrogator 12 then sends a continuous wave RF signal to the transponder 14. The transponder 14 may respond to the interrogator 12 by backscatter modulating the continuous wave RF signal such as described in U.S. Pat. No. 4,739,328 by Koelle, et al. Details of the communication between the interrogator 12 and the transponder 14 will be further described herein. The function of the optional host 16 is to control the operations of the interrogator 12 and the peripheral functions of the toll plaza. Such peripheral functions might include operation of traffic control gates and other lane enforcement equipment such as cameras and traffic lights. Still other peripheral functions might include communications between interrogators 12 and communications with a central office computer (not shown) that might maintain account balance information. Connection 24 between the interrogator 12 and the host 16 as shown in FIG. 1 may be an ethernet, token ring, RS232, RS422 or other connection.

The interrogator 12 of FIG. 1 is housed in two modules: the electronics module 20 and the antenna 18. As shown in FIG. 4, the electronics module 20 contains a transmitter 52, a receiver 54, and a control circuit 56. The interconnection 22 between the antenna 18 and the electronics module 20 consists of a low-loss RF interconnect, which is typically a coaxial cable, and a multi-conductor cable capable of supplying power and control signal information.

FIG. 2 shows a side view of a typical AVI system 10 installation. In this figure a vehicle 26 travels on a vehicle lane 28a–c and approaches the antenna 18. A transponder 14 is located on or within a vehicle 26. Preferably the transponder 14 is mounted to the vehicle front window. In certain applications such as in unusually large vehicles other locations such as on a truck's bumper might be appropriate to reduce variation in height of transponder 14. As shown in the figure, the vehicle 26 carrying the transponder 14 approaches the interrogator 18 at the toll plaza 29. Further details regarding the communication between the transponder 14 and the interrogator 12 will be discussed herein. The components of the interrogator 12 and transponder 14 will also be discussed in greater detail.

FIG. 3 is a top view of an AVI system 10 comprising three lanes 28a–c. The three lanes 28a–c are shown merely for illustration purposes; this system 10 could be applied to one or multiple lanes. Preferably, circuitry is provided in the interrogator 12 for determining in which of the lanes the transponder 14 is located. Claude A. Sharpe's U.S. patent application Ser. No. 08/021,123, assigned to Texas Instruments, provides one such lane discrimination circuit and method.

FIG. 4 provides a block diagram of the major components of the AVI system 10. First, a transponder 14 will be described with reference to FIG. 4 together with FIGS. 2 and 3. The AVI system 10 preferably comprises directional antennas 18, each antenna 18 focused on an associated vehicle lane 28a,28b,28c. A vehicle 26 or vehicles 26 may travel on each lane 28a–c, each vehicle 26 carrying one or more transponders 14. Each transponder 14 preferably comprises: an antenna 30, an analog or analog/digital ASIC 32, a digital ASIC 34, and a modulated reflector 41. Antenna 30 and modulated reflector 41 may form a single integrated antenna 31. Preferably ASIC 32 and ASIC 34 are integrated as a single ASIC.

With further reference to FIGS. 3 and 4, the transponder antenna 30 is operable to receive RF transmissions from the interrogator 12. The analog ASIC 32 converts a signal supplied by the transponder antenna 30 to a voltage which upon exceeding a threshold activates the transponder 14. According to the preferred embodiment of the present invention, the analog ASIC 32 senses high frequency modulation present upon the signal from the transponder antenna 30 and will only activate the transponder 14 upon presence of that specific modulation frequency. In this way, the transponder is relatively immune being awakened by spurious RF transmissions not originating in the interrogator 12, but only is activated when a particular frequency is transmitted by the interrogator 12. The voltage threshold may be adjustable.

Preferably, transponders 14 only responds to interrogation signals from the interrogator antenna 18a–c positioned within the lane 28a–c in which the vehicle 26 carrying the transponder 14 is travelling. To accomplish this desired result, when the transponder 14 compares a first field strength pulse 44a received from the first directional antenna 18a to a second field strength pulse 44b received from the second directional antenna 18b. The transponder 14 may then respond to messages from the appropriate interrogator 12 (i.e., the interrogator associated with the lane 28a,28b, or 28c in which the transponder 14 is travelling). A similar procedure will be repeated between other lane pairs (e.g., 28a–28c, 28b–28c). The transponder 14 is then operable to demodulate a interrogation signal, which in the preferred embodiment is amplitude modulated, from the appropriate interrogator 12. The transponder 14 is then operable to backscatter modulate a continuous wave signal sent by the interrogator 12 to generate an response signal via a modulated reflector 41.

Referring still to FIG. 4, the analog ASIC 32 and digital ASIC 34 typically process the interrogation signal received from the transmitter 52 and formulate the necessary reply data. The digital ASIC 34 then provides the properly formatted reply data stream to a modulated reflector 41. This ASIC 34 might be a simple digital system using a fixed format, or a more versatile digital processing system which can incorporate a number of options. Many options can be envisioned for the ASIC 34 to accomplish, examples include but are not limited to: data storage, data exchange history, and battery capacity warning. The modulated reflector 41 is modulated by changing its apparent wave length, preferably between one fourth and one half the carrier wave length. When the apparent wave length of the modulated reflector 41 is $\frac{1}{2}\lambda$, then the antenna 30 should reflect a large portion of the incident carrier energy. When the modulated reflector 41 has an apparent length of $\frac{1}{4}\lambda$, it will reflect very little of the incident carrier. As is well known in the art, a switching of an antenna between $\frac{1}{2}\lambda$ and $\frac{1}{4}\lambda$, can be accomplished by connecting or disconnecting two $\frac{1}{4}\lambda$, stubs. For the described embodiment, the change in Reflective Cross Section (RCS) is preferably between 45 $cm^2$ and 100 $cm^2$. By varying the RCS according to the specified format, data is sent from the transponder 14 to the interrogator 12. The transponders 14 are typically self-contained on a small credit card size assembly that is completely portable. Preferably an internal battery is provided to give operating power to the transponder 14. Alternatively the transponder 14 might gain its operating power directly from the RF signal. Although the modulated reflector 41 is described as a separate element from the transponder antenna 30, it is possible for both elements to be integrated into a single integrated antenna 31.

Now that the components of the transponder 14 have been generally described, in FIG. 5 with further reference to FIGS. 3–4, a preferred embodiment interrogator 12 will now be generally described. The interrogator 12 is located at a specific point where data exchange is desired, such as a toll plaza 29. The AVI system 10 may include a common reference oscillator 50 which generates at its output 51 a reference carrier wave for synchronization of the interrogators 12. Each interrogator 12 has a directional antenna 18 and a transmitter 52 which transmit a trigger signal 42 of sufficient field strength and/or modulation type at a preselected distance to trigger or activate a transponder 14 being carried in a vehicle 26 in the interrogator's associated vehicle lane 28. The preferred embodiment transponder 14 will be activated when a low power wake-up circuit 64 detects in the received signal a pre-selected modulation frequency.

Still referring to FIG. 5, if the wake-up circuit 64 receives the prescribed modulation signal, the wake-up circuit 64 will then apply clocks to the higher power consumption digital ASIC 34. In this fashion power is conserved because the wake-up circuit 64, which constantly monitors for trigger signals 42 (see FIG. 3), consumes much less power than the digital ASIC 34, which is only activated upon detection of a trigger signal 42 (see FIG. 3). After transmitting the trigger signal 42 (see FIG. 3), the interrogator 12 transmits an interrogation to the remote transponder 14. The interrogation is preferably transmitted using On-Off Keying. Upon completion of the interrogation, the transmitter 52 then transmits a continuous wave RF signal onto the transponder 14 so the transponder 14 may backscatter modulate the continuous wave RF signal to generate the response signal. The interrogator 12 further includes a receiver 54 for reception of the response signal and for separation of the response signal from spurious non-modulated reflections. The interrogator transmitter 52 and receiver 54 operate under control of a control interface circuit 56. The host 16 by way of the control interface circuit 56 directs the transmitter 52 to send the trigger signal 42, followed by the interrogation signal.

To allow proper lane discrimination for a three lane scenario, a first interrogator 12a, second interrogator 12b, and third interrogator 12c send simultaneous first, second, and third interrogation signals, respectively. During a first lane discrimination period 45, first interrogator 12a sends a first field strength pulse 44a and second or third interrogators 12b,12c send no RF energy. During a second lane discrimination period 46, a second interrogator 12b sends a second field strength pulse 44b while first and third interrogators 12a,12c send no RF energy. During a third lane discrimination period 47, a third interrogator 12c sends a third field strength pulse 44c while first and second interrogators 12a,12b send no RF energy. In this manner a transponder 14 travelling in a vehicle 26 in one of the lanes 28a,28b,28c associated with each interrogator 12a,12b,28c can determine by comparing the amplitude of the pulses 44a,44b,44c received during the first, second, and third field strength periods 45,46,47, in which of the three lanes 28a–c it is travelling. The host 16 by way of the control interface circuit 56 is still further operable to direct the transmitter 52 to send the continuous wave RF signal following the interrogation and to simultaneously direct the receiver 54 to receive the response signal. This sequence can be extended to any number of lanes.

The electronic components 20 of the interrogator 12 will now be described in more detail with respect to FIG. 4. The electronics 20 comprise a transmitter 52 that is operable to send signals to the antenna 18 for the interrogation of transponders 14. Typically transmitter 52 receives signals from the host 16 via the host connection 24. During the transponder reply the transmitter 52 transmits a continuous wave RF signal to the transponder 14, which then backscatter modulates the continuous wave RF signal with the reply data. The receiver 54 detects the reflected energy, which is backscatter modulated by the transponder 14, and separates the modulated signal from the non-modulated reflections. Antenna 18, shown here in electrical communication with the transmitter 52 and the receiver 54, is a directional antenna 18 with a precisely shaped pattern and is used to radiate and receive RF signals covering a portion of each lane during the data exchange between the interrogator 12 and the transponder 14. In the described embodiment, a single antenna 18 is used for both the interrogation signal and the response signal. The antenna 18 is typically mounted approximately 18 feet above the roadway and is preferably positioned to ensure a constant link between the interrogator 12 and the transponder 14 regardless of site-dependent variations. Also shown is the control circuit or host interface 56 used to communicate with the host 16, which may control all the interrogators 12 at a single toll plaza.

Still referring to FIG. 4, the host interface 56 between the interrogator 12 and the host 16 for certain read/write operations accepts information from the host 16 via the host connection 24 and formats the data for transmission to the vehicle 26 by means of the transmitter 52. Preferably the communications with the host 16 will not occur until after the transmitter 52 has completed an entire read/write transaction with a transponder 14. The host interface 56 also decodes the reply data from the transponder 14 by means of the receiver 54 and supplies this reply data to the host 16. The antenna 18 is preferably weatherproof and designed to operate over the anticipated temperature extremes in its environment.

Referring now to FIG. 4 in light of FIG. 3, for multiple lanes one interrogator 12 will preferably be provided for each lane. All interrogators 12 at a toll location 29 will be coordinated in frequency, power output and antenna pattern to minimize overlap of coverage and interference between adjacent lanes. A different carrier frequency is typically used in each interrogators 12. Alternatively, adjacent interrogators 12 might have differing carrier frequencies cies to minimize interference as between the adjacent interrogators 12, while non-neighboring interrogators might use the same carrier frequency (i.e., where the interrogators are arranged spatially as #1, #2, #3, #4, #5, and #6, interrogators #1, #3, and #5 might use one carrier frequency while interrogators #2, #4, and #6 might use another carrier frequency). A common carrier frequency might be used in all interrogators 12, such as in a system which provides lane discrimination between transponders 14 as as described in the co-assigned Sharpe U.S. patent application Ser. No. 08/021,123.

The receiver 54 of the interrogator 12 detects the backscatter modulated return signal from the transponder 14. The amplitude and phase of the return signal will be completely dependent upon the multitude of reflections which occur from a number of sources. Undesired sources of return include the following: vehicles 26 in the same lane as the interrogator 12 creating beamfilling or non-beamfilling unmodulated returns; vehicles 26 in adjacent lanes 28a,28b, 28c creating unmodulated and backscatter modulated returns; fixed obstacles of unknown composition creating unmodulated returns; and leakage from the transmitter 52 to the receiver 54 during transmission of the continuous wave RF signal to the transponder 14.

Typically, one interrogator 12 is provided for each lane 28 in which a data link is to be enabled. Furthermore, except for site-programmable internal electrical parameters such as lane location, or other controlled parameters, all interrogators 12 are identical and are coordinated in time by a common reference oscillator 50.

The components of the analog ASIC 32 and the digital ASIC 34 will now be described in greater detail below.

Wake-Up Block

With reference to FIG. 5, a more detailed diagram is shown of the analogy ASIC 32. The interrogation signal is received in the analog ASIC 32 from the antenna 30. The modulation detector 70 acts to remove the carrier signal from the received interrogation signal and pass this to the first stage circuitry 62. The first stage circuitry comprises a lowpass filter 72 which removes high frequency components of the signal from the modulation detector 71). The output of the lowpass filter 72 is further transmitted to a threshold detector 68 that compares the output of the lowpass filter 72 to a reference voltage. The output of the threshold detector 68 will thus be a binary signal which will be an input signal, $d_{in}$, to the digital ASIC 34 and to the wake-up circuitry 64.

With further respect to FIG. 5, the inventive concepts described herein have significant advantages over the prior art in terms of power consumption. It is of significant importance to design a transponder 14 that consumpes minimal power. The importance of a power-efficient transponders 14 exists whether the transponder 14 is powered by a received RF signal or whether the the transponder operates on a battery. By implementing the inventive concepts described herein, the transponder 14 will normally be in a sensing mode with a 1/24 duty cycle sleep mode, drawing little energy from the battery or RF energy source. The only energy consumed in this duty cycle sleep mode will be that required by the wake-up circuit 64.

Still referring to FIG. 5, a high pass filter 74 is provided at the output of the detector 70 to filter out any spurious low frequency signals such as from cellular phones or other sources. The high pass filtered signal is provided from the filter 74 at node "D." The filter 74 may alternatively be a band pass filter. In an alternative embodiment filter 74 may be a low pass filter when the transponder is activated by a low frequency (LF) modulated signal. Upon detection of an RF modulation of the frequency of interest by modulation detector or pulse counter 78, the wake-up circuit 64 sends an enable signal, "F," to OR gate 97 which will in turn send a wake_up signal to the digital ASIC 34 so long as either "F" the clock signal to the digital ASIC 34 to enter an active state. In a first preferred embodiment, the expected modulation frequency will be the high-speed modulation of approximately 100 kHz to 400 kHz. In another preferred embodiment, a low frequency signal of below approximately 1000 Hz is superimposed upon the 915 MHz carrier and this is the modulation signal expected by the pulse counter 78.

In further reference to FIG. 5, for the first preferred embodiment, the pulse counter 78 is preferably a gated 5 bit counter circuit. The gate is set at a specific frequency so that a range of valid counts is detected. To further save power, the wake-up circuit 64 has its power duty-cycled. For example, every 16 ms, a 2 ms window might be opened (1/8 duty cycle), and within the 2 ms window the detector might be on for 62.5 us and off for 125 us (1/3 duty cycle). This example of duty-cycling (1/8×1/3=1/24 duty cycle) would effectively reduce the power consumption to 1/24th of the original value.

Referring now to FIG. 6, the wake-up circuitry 60 is shown in still greater detail. If modulation is detected, the digital ASIC 34 is activated and the pulse counter 78 is kept active by an "assert" signal from the main controller block 140 (see FIG. 11) of the digital ASIC 34. If the modulated RF signal disappears, the main controller block 140 by the "assert" signal may keep the wake_up signal from OR gate 97 active until the digital ASIC 34 functions are completed. The main controller block 140 will not disable the wake_up signal from OR gate 97 until all pending functions are completed.

Still referring to FIG. 6, the detector 70 preferably comprises a diode 82 which receives and rectifies the signal at node "A" from the antenna 31:). A shunt capacitor 84 and shunt resistor 86 act to form a low pass filter having a known time constant so that the 300 kHz Manchester modulation can be extracted from the 915 MHz continuous wave RF signal. A high pass filter 74 then acts to filter out any undesirable low frequency components, The high pass filter 74 comprises a series capacitor 88 and a shunt resistor 90. It is important to understand that the component values of the detector 70 and the high pass filter 74 are selected depending on the modulation frequency that must be detected to enable the digital ASIC 34 by signal "F", (FIG. 4). In other words, the high pass filter 74 may have a very low corner frequency or may be eliminated altogether if the wake-up circuit 64 is expecting a modulation frequency that is lower.

With further reference to FIG. 6, gated comparator 92 receives clock signals from the pulse generator 76 on node "E." The input from the pulse generator 76 serves to gate the voltage pulses from node "D." Thus, if the input from node "D" (flowing from high pass filter 74) is the correct modulation frequency, gated latch 96 serves to provide a high input to an OR gate 97 that performs a logical OR of the "F" signal and an assert signal from the main controller block 140. The "F" signal is asserted once the correct count has been reached and until the falling edge of the gating pulse from the pulse generator 76 resets the gated latch 96. The gated latch 96 serves to provide a high input to a OR gate 97.

Depending on the signal from the gated latch 96 or an "ext_assert" signal from an external microcontroller, the output of OR gate 97 provides a "wake-up" signal to the digital ASIC 34 (see FIG. 5).

Referring now to FIG. 7, a timing diagram for a preferred embodiment modulation detector is shown. The signal at node "D" is shown as a continuous wave 915 MHz signal with 300 kbps Manchester II On-Off Keying (OOK) superimposed. Bursts of 300 kHz modulation occur on the signal at node "D" as the high pass filter removes the 915 MHz carrier signal from the node "A" signal. At node "E" is the gated latch output which exists with a certain duty cycle when modulation is detected by the wake-up circuit 64. The wake-up signal is the output of OR gate 97.

Figure 8:
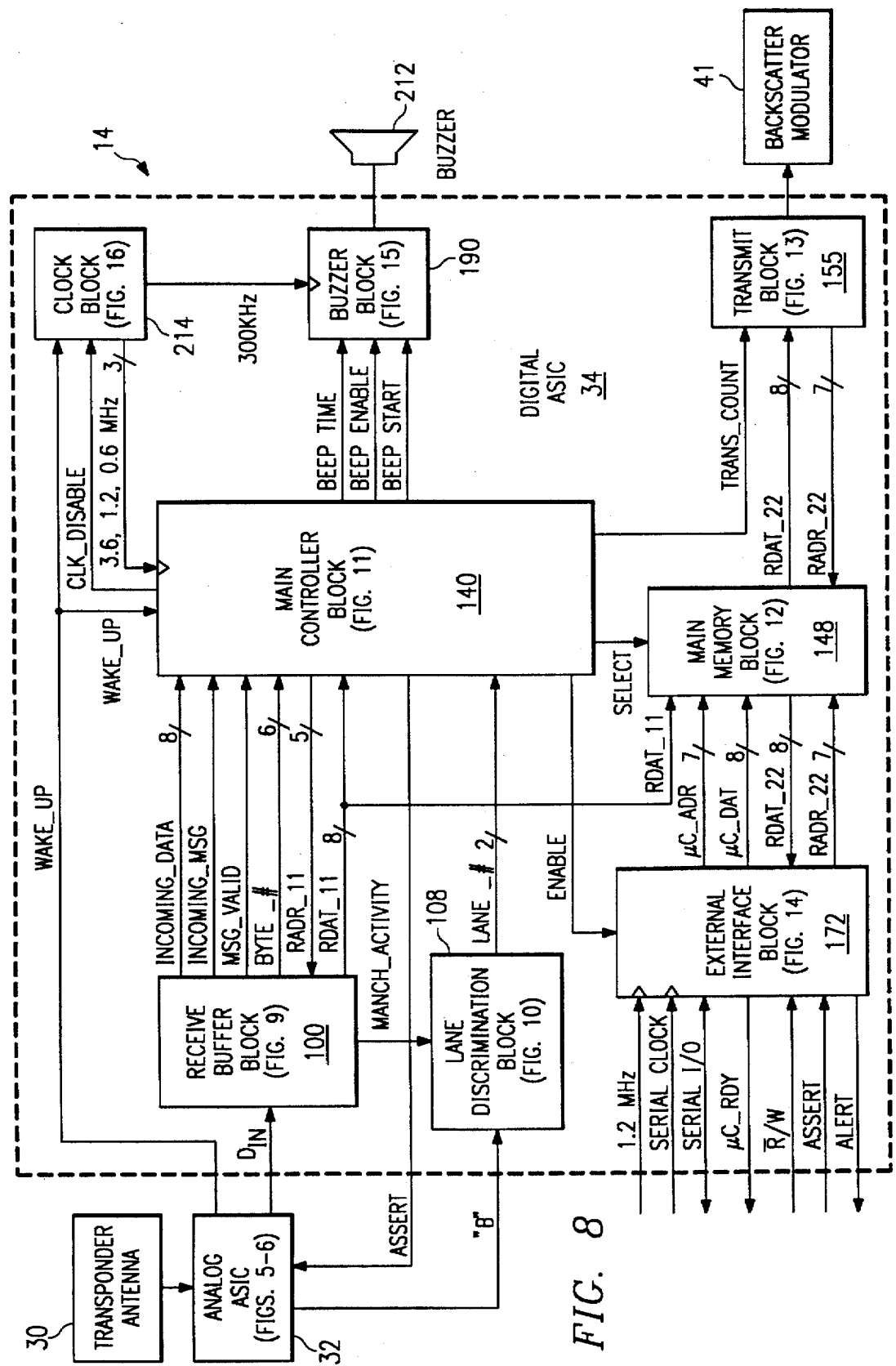
FIG. 8 is a block circuit diagram showing the interconnection of various function blocks of the Application Specific Integrated Circuit (ASIC) of FIG. 5.

FIG. 8 illustrates an overview of the functional blocks 100,108,140, 148,155,172,190,214 within an embodiment of the digital ASIC 34. Within the digital ASIC 34, a clock block 214 receives a wake_up signal from the analog ASIC 32, and thereupon begins to generate clock signals, preferably at 3.6 MHz, 1.2 MHz, 0.6 MHz, and 0.3 MHz. These clock signals are transmitted to the above functional blocks, including at least the main controller block 140. The clock block 214 preferably continues generation of the clock signals, regardless of the status of the wake_up signal received from the analog ASIC 32, until receiving a clk_disable signal from the main controller block 140. Once the RF signal level is removed and the main controller block 140 is in the idle state (i.e., the main controller block 140 has completed all its necessary operations), it will signal the clock block 214 via the clk_disable signal and 0.5 ms later the clock block 214 will disable oscillation of all the clocks. The digital ASIC 34 will remain deactivated until the next RF signal of proper level is detected and the analog ASIC 32 sends another wake_up signal. The nature of CMOS digital logic is that it draws power only when changing states, or to a lesser degree when it is being simply being clocked; therefore, the static current drain of all the digital CMOS logic with the clocks will be very small (in the nano amp range).

Still referring to FIG. 8, the receive buffer block 100 receives a data-bearing signal, $d_{in}$, from the analog ASIC 32. The receive buffer block 100 decodes this signal autonomously from the main controller block 140 and is operable to transmit received data to the main controller block 140 or to main memory block 148. The decoded signal can be received by the main controller block 140 without buffering via the signal, incoming_data. Alternatively, the decoded sinal can be stored and buffered in the receive register 122 (not shown, see FIG. 9) and accessed by the main controller block 140 sending an address signal radr_11. The data output rdat_11 of the receive register 122 (see FIG. 9) may be received directly by the main controller block 140, or it may be received by the main memory block 148 for storage therein. The receive buffer block 100 preferably also provides an incoming_msg signal to notify the main controller block 140 that an interrogation is being received. Furhtermore, the receive buffer block 100 may provide a msg_valid signal to the main controller block 140 to inform it that the interrogation was received without received error. The receive buffer block 100 also might provide a signal, manch_active, to the lane discrimination block 108 to notify the lane discrimination block 108 that the receive buffer block 100 is actively decoding the data-bearing signal, $d_{in}$.

With further reference to FIG. 8, the lane discrimination block 108 is operable to receive $d_{in}$, and manch_activity and determine in which vehicle lane 28 (FIG. 3), the vehicle 26 is travelling. The details of this lane discrimination block 108 is described more fully below, and in Claude A. Sharpe's U.S. patent application Ser. No. 08/021,123, assigned to Texas Instruments. The lane discrimination block 108 upon determination of the vehicle lane 28 (FIG. 3) in which the vehicle 26 (FIG. 2) is travelling, may transmit this information to main controller block 140 as the signal, lane_#.

The main memory block 148 shown in FIG. 8 is operable to store data received from the receive buffer block 100 as mentioned above. Further, the main memory block 148 is operable to receive data from an external microcontroller (not shown) via the external interface block 172. This data exchange is via the addressing signal, radr_22 and via the data signal, rdat_22. The main memory block 148 may also receive data sent from the external microcontroller (not shown) via address and data signals, µC_adr and µC_dat, respectively. The main memory block 148 is may be enabled or disabled by the main controller block 140 by the select signal. The external interface block 172 operates as an interface between the main memory block 148 and an external microcontroller (not shown). The external interface block 148 receives an enable signal from the main controller block 140 and a clock signal from the clock block 214. Preferably, the clock signal is 1.2 MHz. In this embodiment, the external interface block 172 communicates with the external microcontroller (not shown) by a serial_clk signal, a serial_I/O signal, and a number of handshaking signals (µC_rdy, R_/W, and ext_assert) which will be described in more detail in the description with respect to FIG. 14.

A transmit block 155 is also shown in FIG. 8. The transmit block 155 operates under control of the main controller block 140 to transmit data in a response signal to the interrogator 14 (not shown, see FIG. 1 ) by preferably backscatter modulating the data upon a continuous wave RF signal from the interrogator 14 using backscatter modulator 41. The transmit block 155 receives data from the main memory block 148 via the data signal rdat_21 and addresses the main memory block 148 using the address signal radr_21. The transmit block 155 communicates with the main controller block 140 using signals (xmit_data_select, start, xmit_complete, and trans_count) which will be described in more detail in the description with respect to FIG. 14.

Figure 15:
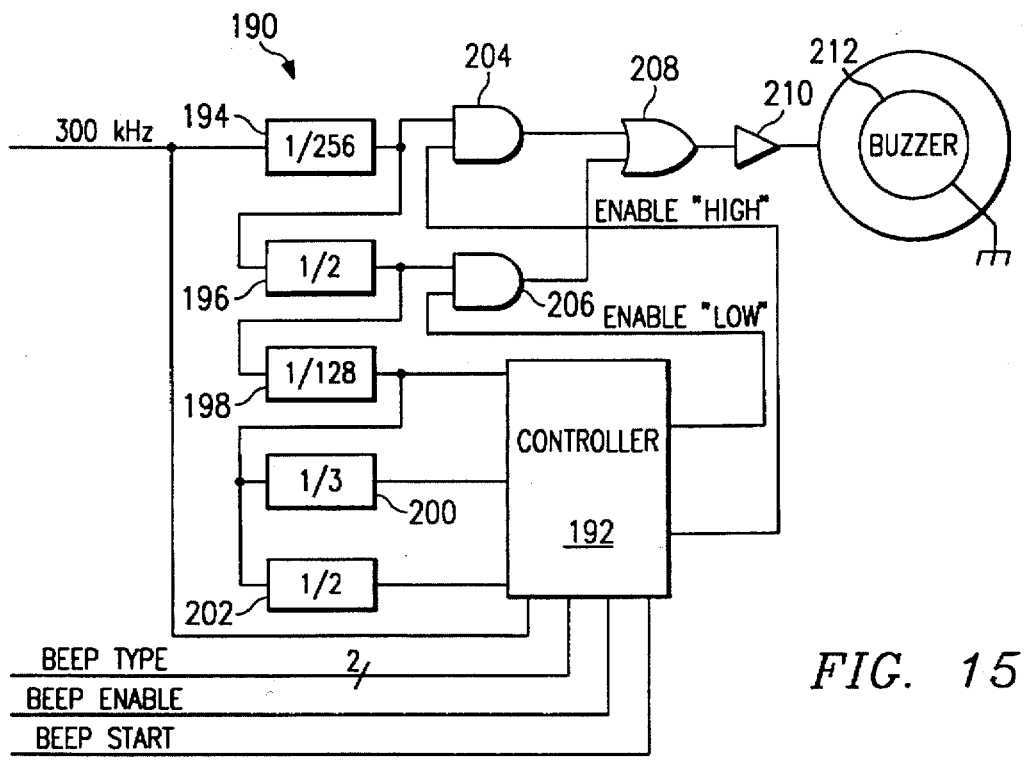
FIG. 15 is a block diagram of the buzzer block preferably within the digital ASIC of FIG. 8.
Figure 16:
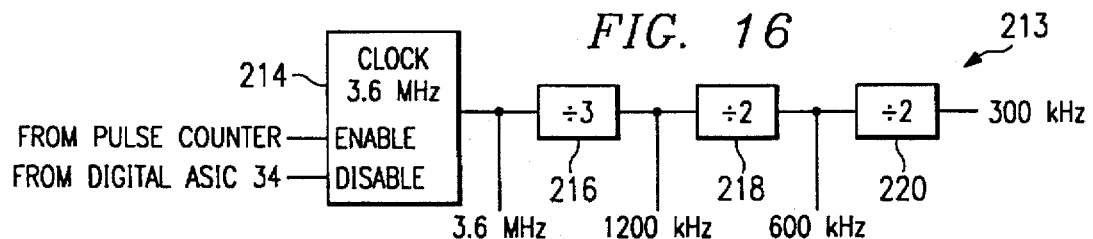
FIG. 16 is a block diagram of the oscillator block preferably within the digital ASIC of FIG. 8.
Figure 17:
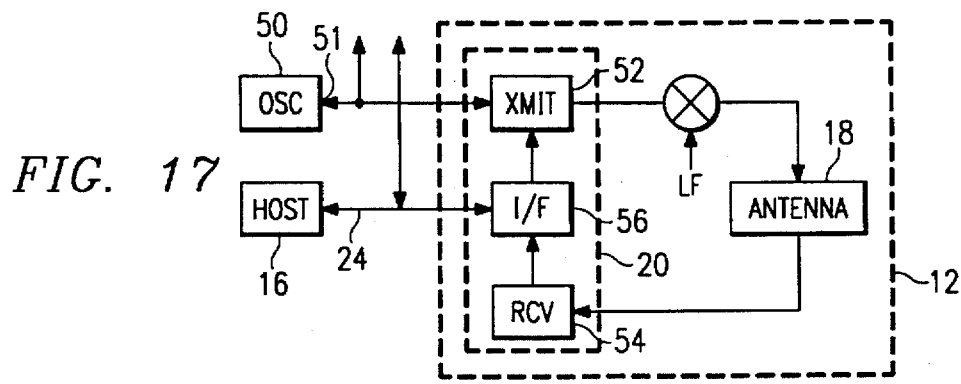
FIG. 17 is a block circuit diagram of an interrogator usable in the transponder and interrogator arrangements of FIGS. 1–3 wherein the interrogator is capable of sending a low frequency modulation signal to activate the transponder according to the present invention.

A buzzer block 190 shown in FIG. 8 operates to transmit indicating tones to an operator via a buzzer 212. The buzzer block 190 operates under control of the main controller block 140. The main controller block 140 sends control signals beep_type, beep_enable, beep_start to the buzzer block 190. These control signals will be described in more detail in the description with respect to FIG. 15.

With further reference to FIG. 8, upon completion of a successful transaction comprising an interrogation and a response in which no data errors occurred, the transponder 14, for example, might enter a 10 second period during which it will not respond to further interrogations having the same agency code as the just-completed transaction. Interrogations received during this nonresponsive period will be compared to the previous agency code, and will not be responded to if the agency code is the same as the previous agency code. If a different, valid agency code is received during the nonresponsive period the transponder 14 may respond to the new interrogation.

Receive/Buffer Block

Figure 9:
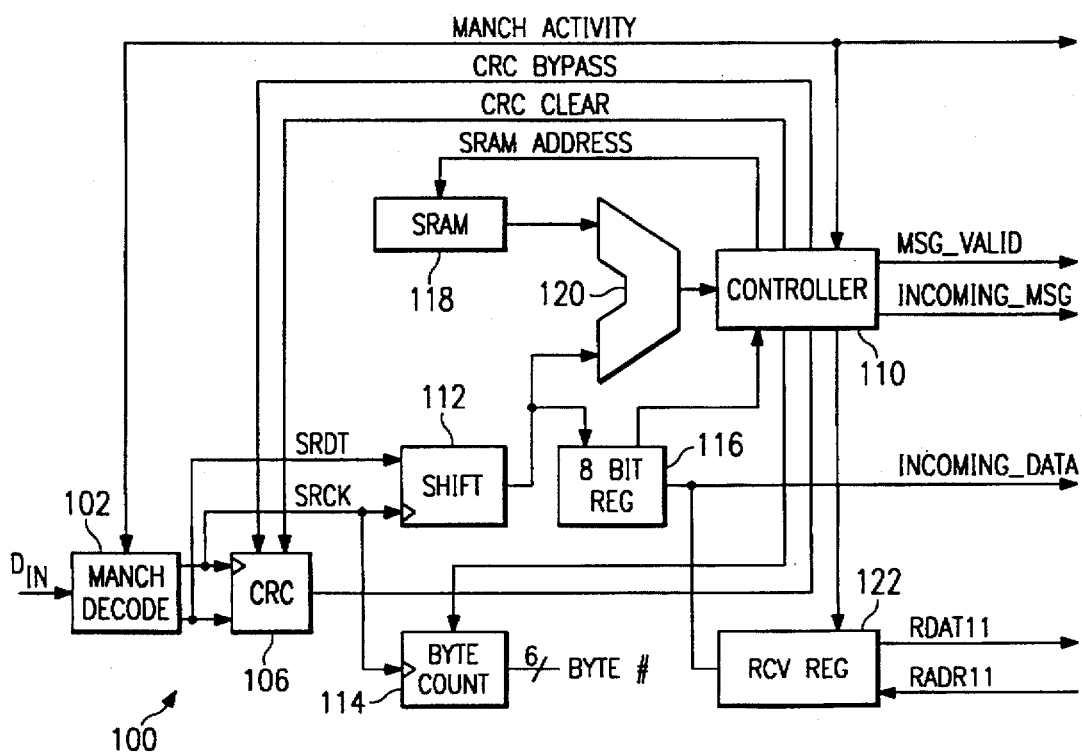
FIG. 9 is a block circuit diagram of a receive buffer block preferably within the digital Application Specific Integrated Circuit (ASIC) of FIG. 8 for receiving signal "A" from the modulation detector.

Referring now to FIG. 9, the components of the receive buffer block 100 of the digital ASIC 34 will be described. The receiver block 100 contains a Manchester decoder 102, CRC-CCITT calculator 106, and a state controller 110. The receiver block 100 will decode transmissions from the interrogator 12, determine in which lane the transponder 14 is located, and calculate the incoming message's CRC. The Manchester decoder 102 receives data-bearing signal, $d_{in}$, from the analog ASIC 32. The Manchester decoder 102 comprises a digital phase-locked loop at 3.6 MHz to enable the derived from the data-bearing signal, $d_{in}$. The Manchester decoder 102 also Manchester to synchronize to $d_{in}$. The Manchester decoder 102 provides at its output a received serial data stream, SRDT, and a clock signal, SRCK, provides a manch_activity signal to the lane discrimination block 108 (see FIG. 8). The purpose of the manch_activity signal will be later described with respect to FIG. 10.

Still referring to FIG. 9, the serial data stream, SRDT, is fed into a CRC generator 106. The CRC of the incoming message is calculated using the CCITT polynomial ($X^{16}$+ $x^{12}+x^5+1$). The receive controller 110 determines which data bits are calculated in the CRC (the overhead bits are not calculated as part of the CRC) and activates the CRC generator 106 to begin calculating the CRC after the overhead bits have all been received. A byte counter 114 is provided to receive the serial data stream and count the number of bytes received. The number of bytes may be counted by incrementing the byte counter 114 with every eighth pulse of the serial data clock and transmitting the count to the main controller block 140 (see FIG. 8). An eight-bit holding register 116 is provided for holding bytes as they are transmitted from the serial-to-parallel shift register 112.

A data comparator 120 is provided so the receive controller 110 can compare data from the serial-to-parallel shift register with that stored in a SRAM 118. In this manner, for example, the transponder identification might be stored in the SRAM 118 and compared to an ID code gleaned from the serial data, SRDT by the receive controller 110 via the serial-to-parallel shift register 112. Thus the receive buffer block 100 operates autonomously from the main controller 104. The receive controller 110 senses received Manchester-encoded data on the manch_activity line from the Manchester decoder 102. The receive controller 110 is further operable to bypass the CRC generator 106 or to reset the CRC generator 106 using control lines crc_bypass and crc_clear. Upon sensing the start of receipt of Manchester-encoded signals, the controller 110 preferably resets the CRC generator 106 and resets the byte count register 114. The controller 110 may control the receive register 122 to store data from the eight-bit holding register 116.

Lane Discrimination Block

Figure 10:
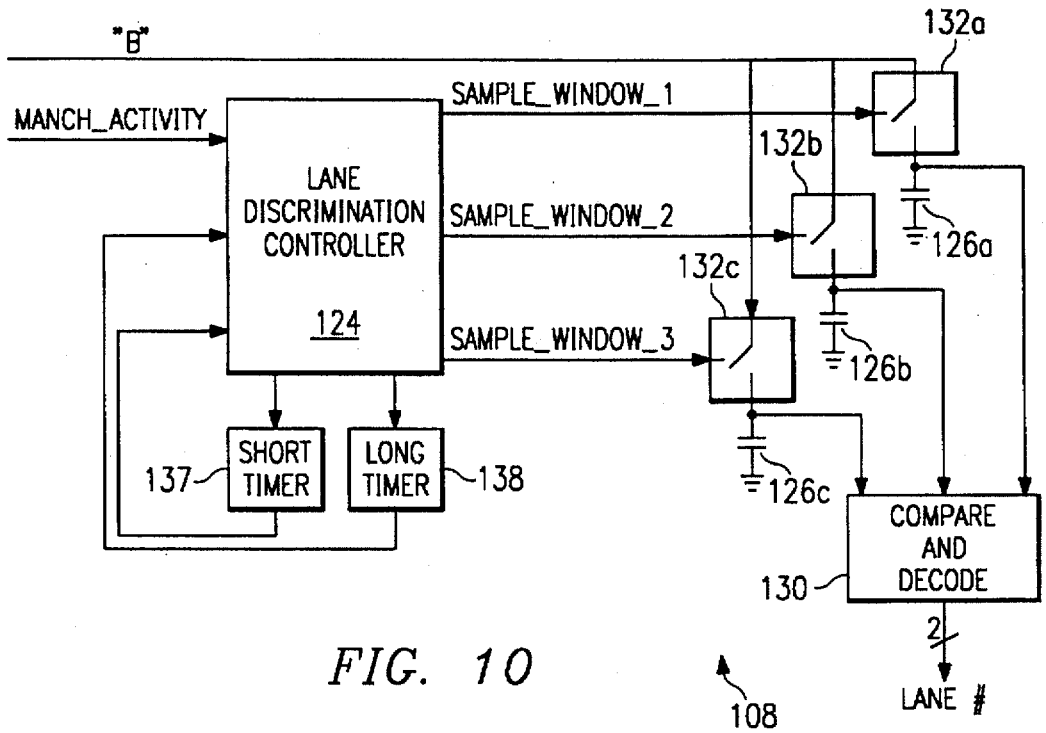
FIG. 10 is a block diagram of the lane discriminator block preferably within the digital ASIC of FIG. 8.

Referring now to FIG. 10, the lane discrimination block 108 includes a lane discrimination controller 124 that samples at three specific times after the interrogation of the transponder 14 by the interrogator 12 is initiated (see FIG. 3). The lane discrimination controller 124 stores voltage samples from node "B" of the analog ASIC 32 (see FIGS. 5, 8) in capacitors 126a, 126b, 126c, whose voltages become inputs to an voltage comparator/decoder 130. The lane discrimination controller 124 samples node "B" during sample periods 45,46,47 (see FIG. 3) to sample field strength pulses 44a–c (see FIG. 3). Switches 132a,134b,132c connect the capacitors 126a,126b,126c, respectively, to the node "B" input voltage (see FIGS. 5, 8). The output of the comparator 130 is sampled a specific time later (after settling) to determine which signal was stronger, and therefore in which lane 28a,28b,28c the transponder 14 is located.

Still referring to FIG. 10, the lane discrimination block 108 is preferably autonomously operable to sample the field strength pulses without need for supervision from the main controller block 104 (see FIG. 8) or other controllers. The lane discrimination controller 124 receives the manch_ activity signal from the Receive Buffer Block 100 (See FIG. 8). Upon the detection of Manchester encoded signals (manch_activity=high), the lane discrimination controller 124 starts a long timer 138 to await the completion of the incoming interrogation (see FIG. 3). After the long timer 138 has completed its cycle, the lane discrimination controller 124 begins to monitor the node "B" voltage for field strength pulses 44a–c (see FIG. 3). A short timer 137 provides 3.3 μs sample timing between the pulses. Using this 3.3 μs timing, the lane discrimination controller 124 is properly synchronized to the sample periods 45,46,47 (see FIG. 3). It should be understood that the timing periods described above are merely exemplary and that other periods may be used depending on system design parameters such as the number of lanes being discriminated between and the length of the interrogation and timing pulses.

Main Controller and Comparator Block

Figure 11:
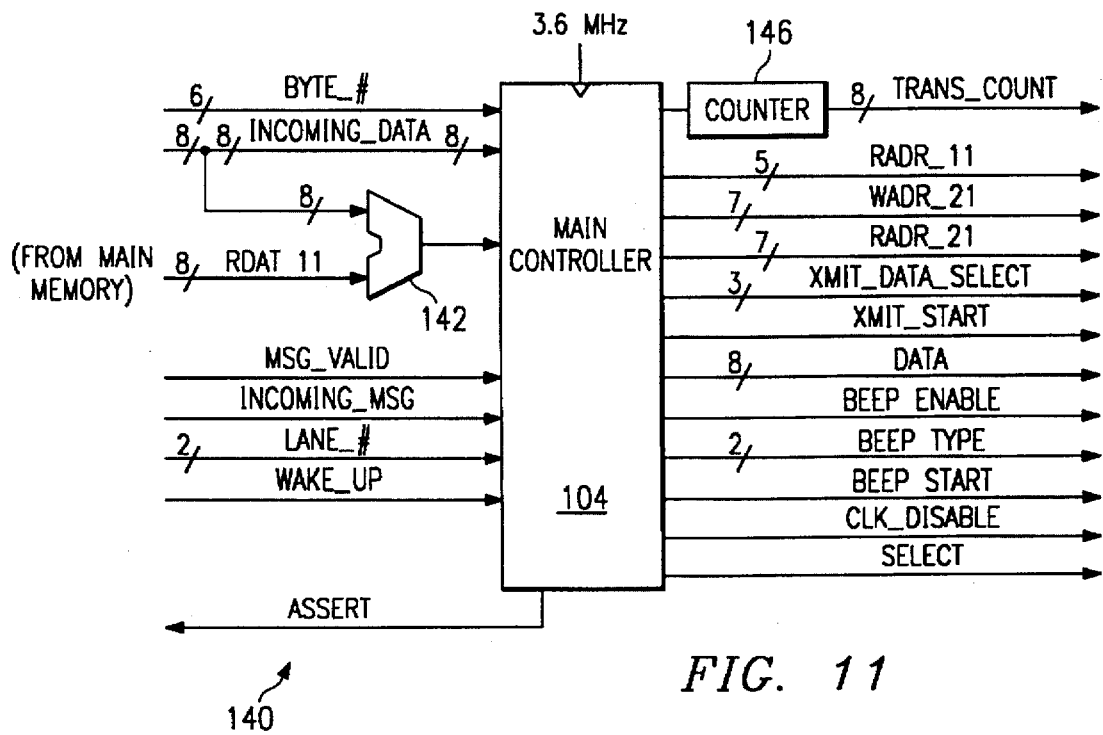
FIG. 11 is a block diagram of the main controller block preferably within the digital ASIC of FIG. 8.

With respect to FIG. 11, the main controller block 140 controls the overall actions of the digital ASIC 34. The main controller 104 is awakened by the "wake-up" signal from the analog ASIC 32 (see FIG. 8). The main controller 104 then makes decisions based on the incoming message content and the current transaction sequence. The comparator 142 takes the incoming messages from the receive buffer 122, verifies the validity of the received message using the calculated CRC, and performs comparisons on the incoming message information. The main controller 104 executes the appropriate command sequence.

Still referring to FIG. 11, a Record Type Code (16 bits) of the incoming interrogation is used to determine the order and type of comparisons performed. This code uniquely defines the transponder message fields and functions permissible. By way of example, hexadecimal numbers 1 through 7FFF may be set aside for transponder message structures and 8000 through FFFF may be dedicated for reader-to-transponder message structures. After the interrogation has been tested for data errors using its CRC, the Record Type Code is examined and the comparator circuit 142 sets flags in accordance with the Record Type Code. The main controller 104 acts upon the flags generated by the comparator circuit 142 and takes the appropriate actions to analyze the data content of the interrogation, to generate the data for the transponder's 14 responses, and to signal the optional external microcontroller (not shown) or to perform ASIC maintenance functions (discussed below under the heading "MAINTENANCE MODE AND MESSAGES"). The main controller 104 also acts to load the main memory block 148 (see FIG. 8) with information by providing addresses to the main memory block 148 in which to store data. Typically the source of this data would be the received interrogation or the external microcontroller (not shown).

With further respect to FIG. 11, transaction counter 146 is an 8 bit counter which is incremented at the end of an acknowledgment message from the interrogator 12 (see FIG. 1) if the transaction was successfully completed (e.g., the interrogator 12 received a valid ID code from the transponder 14). The transaction counter 146, though part of the main controller 104, is addressed within the address space of memory block A. The transaction counter 146 provides a circulating 8 bit number which can be used to track successful toll transactions and maintenance operations for bookkeeping purposes (much as a "check number" keeps track of personal bank transactions). The value of the transaction counter is not normally programmed, but may be reset to zero by resetting the ASIC via the external reset pin or by another method.

As can be seen in FIG. 11, in addition to performing functions relating to the receipt and processing interrogation messages, the main controller 104 acts somewhat as a nerve center for the transponder 14. Many of the control signals pass to and from the main controller 104 to the other function blocks 100,108,140, 148,155,172,190,214. The main controller 104 receives its timing from the exemplary 3.6 MHz clock from the clock block 214. The clock block 214 preferably continues generation of the clock signals, regardless of the status of the wake__up signal received from the analog ASIC 32, until receiving the clk__disable signal from the main controller 104.

Still referring to FIG. 11, the main controller 104 may receive data from the receive buffer block 100 either without buffering via the signal, incoming__data. Alternatively, the decoded signal can be stored and buffered in the receive register 122 (not shown, see FIG. 9) and accessed by the main controller block 140 sending an address signal radr__11. The main controller 104 is also operable to store data in main memory block 148 by sending address signal wadr__21 and by enabling main memory block 148 by the "select" signal. Main memory 148, once so selected, will be operable to receive data directly from the receive buffer block 100 by signal rdat__11. The receive buffer block 100 preferably also provides an incoming__msg signal to notify the main controller block 140 that an interrogation is being received. Furhtermore, the receive buffer block 100 may provide a msg__valid signal to the main controller block 140 to inform it that the interrogation was received without received error.

With further reference to FIG. 11, the main controller 104 receives a signal, lane__#, from the lane discrimination block 108 to determine in which vehicle lane 28 (FIG. 3) the vehicle 26 bearing the transponder is travelling (see FIG. 2). The transmit block 155 operates under control of the main controller block 140 to transmit data in a response signal to the interrogator 14 (not shown, see FIG. 1) by preferably backscatter modulating the data upon a continuous wave RF signal from the interrogator 14 using backscatter modulator 41. The transmit block 155 receives data from the main memory block 148 via the data signal rdat__21 and addresses the main memory block 148 using the address signal radr__21. The transmit block 155 communicates with the main controller block 140 using signals (xmit__data___select, start, xmit__complete, and trans__count) which will be described in more detail in the description with respect to FIG. 14. The main controller 104 controls the buzzer block by control signals beep__type, beep__enable, and beep__start. These control signals will be described in more detail in the description with respect to FIG. 15.

Memory Block

Figure 12:
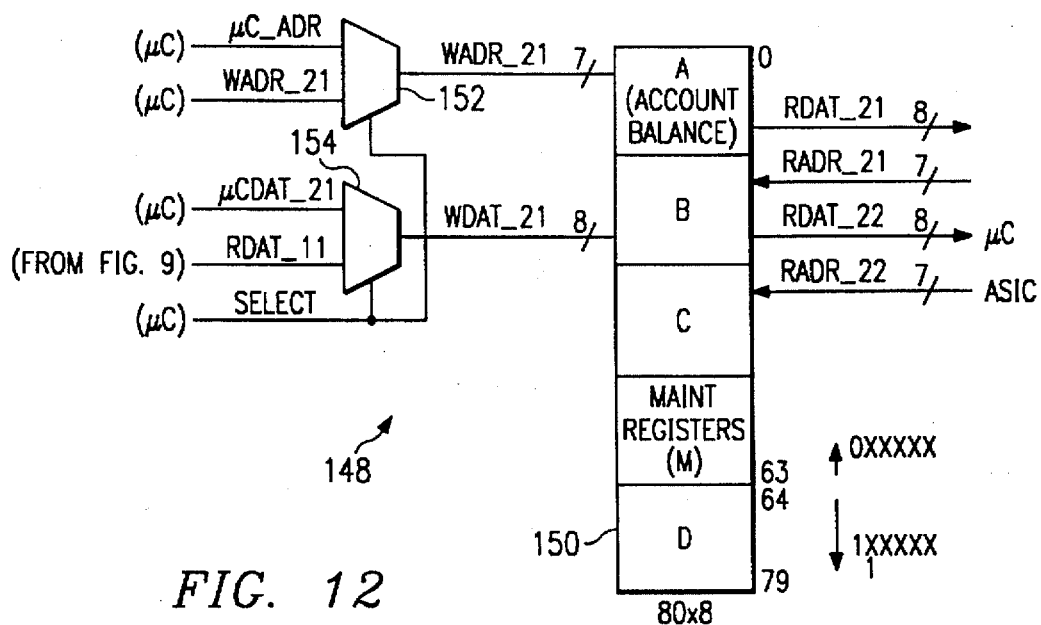
FIG. 12 is a block diagram of the main memory block preferably within the digital ASIC of FIG. 8.

The main memory 150 shown in FIG. 12 has memory blocks A, B, C, D and M. Preferably, each of the exemplary five blocks of memory is available for transmission to the interrogator 12 by the transmit block 155 (see FIG. 8). The memory 150 is preferably a multi-port SRAM, allowing simultaneous read and write operations. Preferably memory 150 is a SRAM having a capacity of 80 bytes, however, memory 150 might be non-volatile memory (e.g., EEPROM, ROM). Further, memories having more or fewer than 80 bytes could be implemented in an AVI system or other systems in accordance with this invention.

Still referring to FIG. 12, the selection muxes 152,154 allow writing to the memory from the main controller 104, from the external microcontroller (not shown) through the external interface block 172. Through the interrogation message, the interrogator 12 may ask the transponder 14 for a 16 byte data transmission of memory block A, B, C, D, or M. As an alternative, the interrogation message might instruct the transponder 14 to send a longer burst of data, such as 32 byte data transmission. For example, a 32 byte data transmission might comprise consecutive transmissions of memory blocks A and B, or of memory blocks A and C, or of memory blocks A and D, or of memory blocks A and M.

The basic function of each of the memory blocks (A,B, C,D,M) might be, for example:

Memory block A: basic accounting information;

Memory block B: law enforcement information;

Memory block C: tollway open-entry information storage;

Memory block D: microprocessor output data transmit buffer;

Memory Block M: maintenance and control functions.

Two special registers are part of memory block A's address space: the transaction counter 146 (not shown, See FIG. 11) and the FLAGS register. Although the transaction counter 146 is part of the main memory's addressing space, because of its logical relationship to the main controller block 140, it is included in FIG. 11 and the description thereof. The second special register in memory block A is the FLAGS register. This 8 bit register indicates the capabilities of the transponder 14 to the interrogator 12, and certain bits are programmed by a service center. The individual bits of the FLAGS register are defined as:

| bit# | externally writable? | function |
|---|---|---|
| 0 | yes | 0= no balance stored in transponder,<br>1= account balance stored in transponder |
| 1 | yes | 0= account ok,<br>1= delinquent account |
| 2 | yes | 0= no lane discrimination,<br>1= lane discrimination enabled |
| 3 | yes | 0= internal tag, 1= external tag |
| 4 | no | 0= OK,<br>1= illegally detached from external mounting |
| 5 | yes | (reserved) |
| 6 | no | Battery Consumption Gauge LSB |
| 7 | no | Battery Consumption Gauge MSB |

Bits 0 and 2 are information bits for the Reader and set at the service center. Bits 1 and 3 reflected enabled or disabled ASIC circuitry, and are set at the service center. Bit 4 is set by the interrogator 12, but may be reset at a service center. Bits 7 and 6 are the high-order bits from the battery consumption meter.

An exemplary structure of memory block A:

| byte # | function |
|---|---|
| 1 | account ID byte 1, MSB |
| 2 | account ID byte 2 |
| 3 | account ID byte 3 |
| 4 | account ID byte 4 |
| 5 | account ID byte 5 |
| 6 | account ID byte 6, LSB |
| 7 | account balance byte 1 (if no uc, these are 0's), MSB |

-continued

| byte # | function |
|---|---|
| 8 | account balance byte 2 (if no uc, these are 0's), LSB |
| 9 | (specified) |
| 10 | (specified) |
| 11 | (specified) |
| 12 | (specified) |
| 13 | (specified) |
| 14 | (specified) |
| 15 | FLAGS register |
| 16 | Transaction # register |

The structure of memory block B may be "free-form" or not rigidly specified as is memory block A. The contents of memory block B (16 bytes) may be written at the service center by the toll agency or other authorized entity, but can be read by the reader 12. Memory block B may, for example, contain read-only type information (law enforcement info, license plate number, transaction agency code, etc.).

The structure of memory block C may also be "free-form." The purpose of this memory block is to pass information (such as tollway entry info) from one reader to another interrogator 12. For example, a first interrogator 12 may store information in the transponder 14 by sending data which the main controller block 148 (see FIG. 8) can store in memory block C by sending the appropriate addressing information. Another, subsequent interrogator 12 may then by sending an appropriate Transaction Record Type Cod (such as the Type 3A, described below, under the heading "Transaction Record Type Codes) read the contents of memory block C. By these methods communication may be effected between different interrogators 12.

Memory block D is intended to be used by the main controller 104 as a transmit buffer (16 bytes) for information from an optional external microcontroller (not shown) to a interrogator 12 or a service center. The contents of memory block D (16 bytes) is primarily intended to be loaded by the external microcontroller (not shown). If an external microcontroller (not shown) is not present in the AVI system 10, block D can be used "free-form" as another 16 bytes of information which can be loaded by the service center or interrogator 12, and read by a service center or reader 12. As an alternative to storing microcontroller access functions, block D might be used as additional storage in normal operations even with a microcontroller present.

Maintenance Block Register Functions:

| byte# | function |
|---|---|
| 1 | agency code, MSB |
| 2 | agency code, LSB |
| 3 | CONFIGURATION register |
| 4 | Analog ASIC configuration word, MSB |
| 5 | Analog ASIC configuration word |
| 6 | Analog ASIC configuration word, LSB |
| 7 | |
| 8 | |
| 9 | |
| 10 | |
| 11 | |
| 12 | battery consumption gauge byte 1 - LSB |
| 13 | battery consumption gauge byte 2 |
| 14 | battery consumption gauge byte 3 |
| 15 | battery consumption gauge byte 4 |
| 16 | battery consumption gauge byte 5 - MSB |

Transmitter Block

Figure 13:
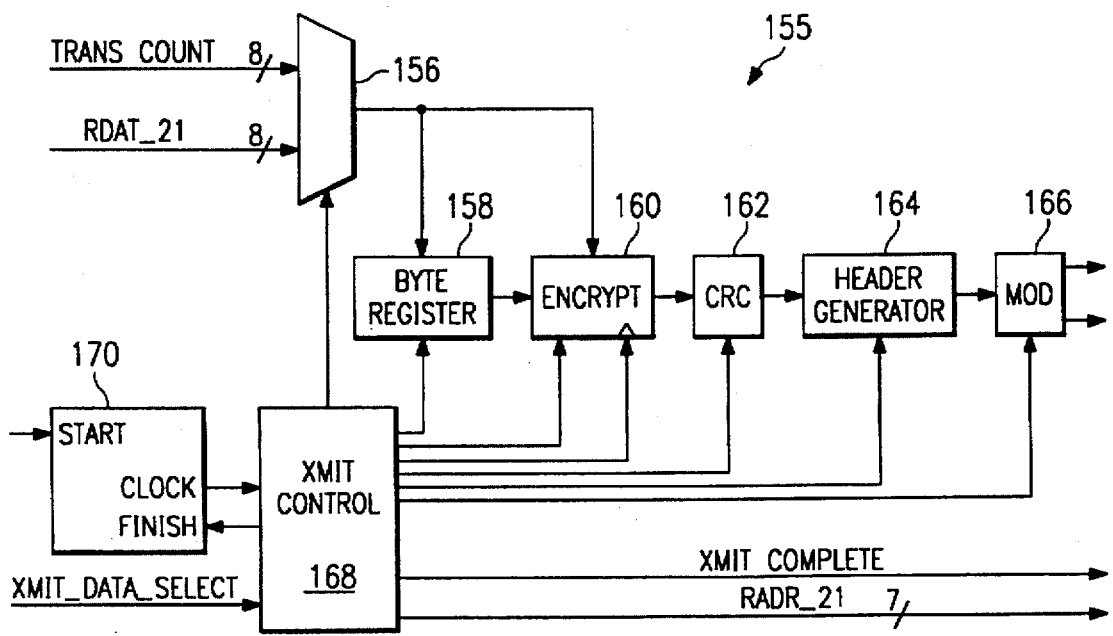
FIG. 13 is a block diagram of the transmit block preferably within the digital ASIC of FIG. 8.

With reference now to FIG. 13, the transmitter block 155 contains a mux 156, a byte register 158, an encryption circuit 160, a CRC generator 162, a header generator 164, an FSK modulator 166, and a controller 168. The serial data stream to be transmitted is encrypted by the encryptor 160, passed through the CRC generator 162, and transmitted via the FSK modulator 166. Upon being commanded by the main controller block, the transmitter block control circuitry 168 is enabled. The transmitter controller 168 then transmits the "selsyn" signal, which may be used by the receiver 54 within the interrogator 12 to self-synchronize (selsyn) with the transponder 12 response. An exemplary selsyn signal might the binary and hexadecimal values: 10101010 and AA, respectively. Upon completion of sychronization with the interrogator receiver 54, the transmitter controller 168 then signals the main controller 104 for the appropriate memory block data to be clocked in at 300 khz. When the main controller 104 signals the end of data, the CRC circuit 162 clocks out the CRC. Upon completion of the transmission of the CRC bits, the transmitter block 155 enters the idle state and signals the main controller 104 to disable the transmitter clock block 214 for lowest power consumption.

The encryption circuit 160 uses multiple keys. The encryption function may be deactivated at the service center. The CRC generator 162 calculates the CRC using the CCITT polynomial ($x^{16}+x^{12}+x^5+1$). The data input to the CRC generator 162 is the encrypted data stream. The CRC value is always transmitted as unencrypted information.

Interface Controller Block

Figure 14:
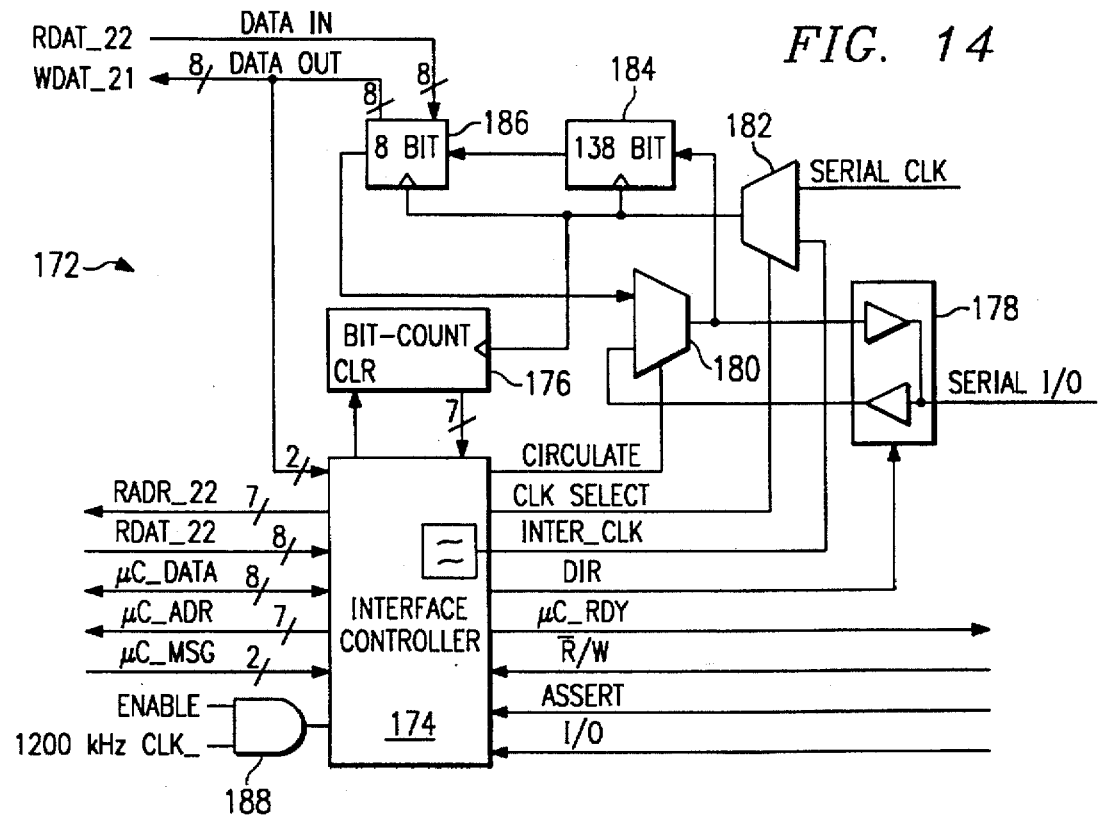
FIG. 14 is a block diagram of the external interface block preferably within the digital ASIC of FIG. 8.

FIG. 14 shows an external controller interface circuit 172. The interface circuit 172 provides flexibility in the transponder 14 design, allowing future upgrades to the system with minimal effort. The interface circuit 172 allows an external microcontroller (not shown) to communicate with the transponder 14. The interface controller 174 may be activated by the main controller 104 by the "enable" signal between the two functional blocks (see FIG. 8). When awakened by the external microcontroller, the interface controller 174 senses that the "ext_assert" signal is active and will proceed to communicate with the external microcontroller. The interface circuit 172 overcomes problems with designing the transponder 14 for future compatibility with unknown external circuitry having unknown future interface requirements. In order to allow the unspecified external circuitry or external microcontroller to access the transponder memory 150 at a clock rate of its own choosing, a buffer memory comprising an 8 bit shift register 186 and a 138 bit shift register (146 bit shift register) 184 is provided.

The interface controller 174 forms the heart of the interface circuit 172. In a write mode, the transponder 14 communicates with the external microcontroller. The interface controller 174 receives messages from the main controller 104 via the control line µC_MSG and will wake up the external microcontroller with the signal µC_RDY. Data is loaded from the main memory 150 into the 8 bit shift register 186. Once a byte is loaded in parallel into the 8 bit shift register 186, the 8 bits are then circulated serially into the 138 bit shift register through the mux 180. The function of mux 180 is to allow data to be clocked into the 138 bit shift register 184 from the 8 bit shift register 186 or to allow it to be clocked in from the external microcontroller via the serial I/O buffer 178. As can be seen in FIG. 14, when the "circulate" signal is low-asserted, data passes through the mux 180 from the serial I/O buffer 178. When the "circulate" signal is high-asserted, data passes through the mux 180 from the serial output of the 8 bit shift register 186. Thus, the data can be loaded into the 8 bit shift register 186 in groups of 8 and circulated about into the 138 bit shift register 184 until the message is completely loaded. Once the message is completely loaded, the "circulate" signal is low-asserted. Alternatively, the interface controller 174 may be activated by the external microcontroller by raising the "ext_assert" signal, whether or not the external RF field has activated the transponder 14. In either case, the interface controller 174 sends a seven bit address, RADR_22 to the main memory block 148 so that data can be loaded into or out of the 8 bit register 186 via RDAT_22.

One of the advantages of having an interface circuit interposed between the main controller 104 and an external microcontroller is that by buffering and by design of the clocking to the 146 bit register 186,184 the external microcontroller is free to send its own serial clock signal to mux 182 for clocking data into or out of the 146 bit register 186,184. As shown in the figure, the interface controller 174 directs the mux 182 to pass either this serial clock from the external microcontroller or to pass its own clock to the 146 bit register 186,184. Flexibility thus exists to load and unload data into the register at any practical clock rate of the external microcontroller.

Serial I/0 buffer 178 can enable data flow either direction, the direction depending on its single control line, DIR, from the interface controller 174. Further, not only is the external microcontroller capable of awakening the transponder 14 by the "ext_assert" line, the interface controller 174 can awaken the external microcontroller by signaling over the uc_rdy signal output. A bit-count circuit 176 monitors the incoming data stream and serves to orient the interface controller 174 to the start of data in the circulating shift register 184. The function of the interface controller 174 is to read and write 16 bytes of data to/from the optional, external microcontroller and to serially program (configure) the analog ASIC 32.

The interface controller 174 is capable of direct communication with the main memory 150 through the buses μC_MSG, and through the buses RADR_22[0:6] (address), DATA[0:7] (data), and μC_ADR[0:7].

A three bit command word is loaded first into the 8 bit register 186. The three bit command word informs the external microcontroller the nature of the ensuing message. The bytes of information that follow are loaded one byte at a time and then are shifted out and circulated through the mux 180 into the 138 bit shift register. After the ensuing message has been completely loaded, the shift registers 184,186 are clocked until the original two bits are again located at the beginning of the 8 bit register 186. At this time, the clk_select line may asserted so that the serial clock from the external processor can be used to clock the data out of the shift registers 184,188, the control line into the serial I/O buffer 178 is asserted to allow data to be output, and the uc_rdy is asserted to wake up the external microcontroller.

In a first mode, upon awakening, the external microcontroller has the R_/W signal set low. The external microcontroller will then serially shift in the first three bits to determine the nature of the ensuing message. After the external microcontroller has clocked in as many bits as required from the three bit message from the transponder 14, the microcontroller sets its R_/W signal high to indicate that it has completed receiving data. Upon seeing the R_/W signal asserted high, the interface processor sets the serial I/O buffer 178 to input mode, asserts the circulate signal low so data can again be loaded into the shift registers 184,186 in a circular fashion, and the clock signal is again set to the interface controller 174 so it may again take control of the loading and unloading of the shift register 184,186.

In another mode, if the external microcontroller has data to send to the digital ASIC 34 it can wake up the interface controller 174 by the "ext_assert" signal. As before, the interface controller 174 sets the clock mux 182 to pass the serial clock from the external microcontroller. In this mode, the R_/W is asserted high. The external microcontroller will then shift data serially directly into the 138 bit shift register 184 and will continue until it has sent the necessary data and until the data has been shifted 146 times to load the first bit of the message into the 8 bit shift register 186. The interface controller 174 can then again take control of the clock by asserting the clk select line low to the clock select mux 182. Data can then be loaded out of the 8 bit shift register 186 into block D the main memory 150. The data is extracted one byte at a time, after which the clock transitions eight times to serially shift a new byte from the 138 bit register 184 into the 8 bit register 186. Unloading and shifting continues until the entire message has been transferred into the main memory 150.

Asic Command Structure and Protocol

The preferred embodiment ASIC 34 uses the CALTRANS specification for its communications protocol. The CALTRANS specification is specific to many aspects of the message content, and the ASIC command structure complies with the CALTRANS requirements.

The Reader 12 commands the transponder 14 through the use of 4 bytes: the record type (2 bytes) and the status code (2 bytes). The record type is sent as the first 2 bytes following the header in the POLL and the ACKNOWLEDGE messages, and the status code is included as part of the ACKNOWLEDGE message only.

The record type and status code have different effects upon the ASIC 34 depending upon whether the transponder 14 is an ASIC-only unit or if the transponder 14 has a ASIC 34 plus an external microcontroller. FIG. 14 in connection with the specification herein illustrates the ASIC interface circuitry for interfacing with an external microcontroller. The use of the CCITT CRC polynomial and "sanity checks" on record types and the message structure assure that the proper toll transactions will occur without error. Should the ASIC encounter an unknown record type or message, it will ignore the information and no action will be taken.

Structure of the record type (all messages):

The record type consists of the first two bytes following the header in each POLL and ACKNOWLEDGE message. It may act as a function in itself, or additional commands may be sent via the use of the status code (in the ACKNOWLEDGE message). The basic function of the record type is to tell the receiver (transponder or Interrogator) how to decode the fields in the message that it has just received, and to deliver to the ASIC an instruction to perform.

The CALTRANS specification requires that a record type code range of 0×0001 through 0×7FFF will be reserved for transponder-to-Reader messages, and the record type code range of 0×8000 through 0×FFFF will be reserved for Reader-to-transponder messages.

Transaction Record Type Codes:

The following record types are understood and acted upon by the ASIC (in association with a valid agency code):

(Should on-transponder 14 lane determination be disabled via the FLAGS register, the lane bit in the record type may be ignored and the transponder 14 may will respond to a POLL message regardless of its lane position.)

0x8000  Type 1 POLL message- the transponder 14 is requested to send memory block A in the next RESPONSE message (any lane).
0x8001  Type 2 POLL message- the transponder 14 is requested to send memory blocks A and B in the next RESPONSE message (any lane).
0x8002  Type 3 POLL message- the transponder 14 is requested to send memory blocks A and C in the next RESPONSE message (any lane).
0x8003  Type 4 POLL message- the transponder 14 is requested to send memory blocks A and D in the next RESPONSE message (any lane).
0x8010  Type 1A POLL message- the transponder 14 is requested to send memory block A in the next Lane A RESPONSE message.
0x8011  Type 2A POLL message- the transponder 14 is requested to send memory blocks A and B in the next Lane A RESPONSE message.
0x8012  Type 3A POLL message- the transponder 14 is requested to send memory blocks A and C in the next Lane A RESPONSE message.
0x8013  Type 4A POLL message- the transponder 14 is requested to send memory blocks A and D in the next Lane A RESPONSE message.
0x8020  Type 1B POLL message- the transponder 14 is requested to send memory block A in the next Lane B RESPONSE message.
0x8021  Type 2B POLL message- the transponder 14 is requested to send memory blocks A and B in the next Lane B RESPONSE message.
0x8022  Type 3B POLL message- the transponder 14 is requested to send memory blocks A and C in the next Lane B RESPONSE message.
0x8023  Type 4B POLL message- the transponder 14 is requested to send memory blocks A and D in the next Lane B RESPONSE message.
0x8030  Type 1C POLL message- the transponder 14 is requested to send memory block A in the next Lane C RESPONSE message.
0x8031  Type 2C POLL message- the transponder 14 is requested to send memory blocks A and B in the next Lane C RESPONSE message.
0x8032  Type 3C POLL message- the transponder 14 is requested to send memory blocks A and C in the next Lane C RESPONSE message.
0x8033  Type 4C POLL message- the transponder 14 is requested to send memory blocks A and D in the next Lane C RESPONSE message.

The following record types are defined for the RESPONSE message:

0x0001  Transaction Type 1 RESPONSE
        The transponder 14 is responding with memory block A (16 bytes).
0x0002  Transaction Type 2 RESPONSE
        The transponder 14 is responding with memory blocks A and B (32 bytes).
0x0003  Transaction Type 3 RESPONSE
        The transponder 14 is responding with memory blocks A and C (32 bytes).
0x0004  Transaction Type 4 RESPONSE
        The transponder 14 is responding with memory blocks A and D (32 bytes).

The following record types are defined for the ACKNOWLEDGE message:

0xC000  Transaction Type 1 ACKNOWLEDGE message- (transaction successful). The transaction counter 146 is incremented, and the transponder 14 enters a ten second "silence" period. A microcontroller message will be generated. The buzzer will beep 3 short high tones.
0xC001  Transaction Type 2 ACKNOWLEDGE message- (transaction pending). The transponder 14 will respond to the next appropriate POLL message. The status code may contain further instructions. A microcontroller message will be generated. This is essentially a "no action" code.
0xC002  Transaction Type 3 ACKNOWLEDGE message- (open entry - load block C). The 16 bytes following the status code will be written into memory block C. The transponder 14 enters a ten second "silence" period. The status code and the 16 bytes following the status code will be formatted into a microcontroller message (if a microcontroller is present). The buzzer will beep 1 short high tone.
0xC003  Transaction Type 4 ACKNOWLEDGE message- (load block D) The 16 bytes following the status code will be written into memory block D. The transponder 14 enters a ten second "silence" period. The buzzer will beep 1 short high tone.
0xC004  Transaction Type 5 ACKNOWLEDGE message- (bounce transaction). The Reader 12 has read the FLAGS register, and the bounce bit was found to be set by a previous Reader 12 transaction sequence. The transaction counter 146 is not incremented. The transponder 14 enters a ten second "silence" period. A microcontroller message will be generated. (This might be used to silence a bounced transponder 14 instead of using a Transaction Type 1 record type.) The buzzer will beep 2 long low tones.
0xC005  Transaction Type 6 ACKNOWLEDGE message- (load block C) The 16 bytes following the status code will be written into memory block C. The transponder 14 will respond to the next POLL message. The status code and the 16 bytes following the status code will be formatted into a microcontroller message.
0xC006  Transaction Type 7 ACKNOWLEDGE message- (load block D) The 16 bytes following the status code will be written into memory block D. The transponder 14 will respond to the next POLL message.
0xC007  Transaction Type 8 ACKNOWLEDGE message- (microcontroller message) The status code and the 16 bytes following the status code will be formatted into a microcontroller message. The transponder 14 enters a ten second "silence" period. (This could be used to load the EEPROM history file.) The buzzer will beep 3 short high tones.
0xC008  Transaction Type 9 ACKNOWLEDGE message- (transponder 14 turn-on). The ACKNOWLEDGE message contains the previously-silenced transponder 14 account number, and the transponder 14 will now become active and will respond to the next POLL message.
0xC009  Transaction Type 10 ACKNOWLEDGE message- (transponder 14 silenced.) No transaction will take place. Although the transponder 14 responded, it is not a proper account for this tollway. The transponder 14 enters a ten second "silence" period. A microcontroller message will be generated. The buzzer will beep 1 long low tone.
0xC00A  Transaction Type 11 ACKNOWLEDGE message- (transponder 14 silenced.) No transaction will take place. The transponder 14 enters a ten second "silence" period. No microcontroller message will be generated.
0xC00F  Transaction Type 16 ACKNOWLEDGE message- (bounce transponder). The bounce bit will be set in the FLAGS register, and the transaction counter 146 will be incremented. A microcontroller message will be generated. The transponder 14 will continue to respond to an agency or maintenance code POLL request, but the Reader 12 will recognize immediately that the user account has a problem, and the transponder 14 will require a service center trip. The buzzer will beep 2 long low tones.

Structure of the status code from the ACKNOWLEDGE message:

The 16 bit status code from the ACKNOWLEDGE message is encoded with special fields. The first three bits (MSB's) are coded as:

000  no operation
001  (reserved)
010  (reserved)
011  (reserved)
100  decrements account balance (uc).
     Then the next thirteen bits describe an unsigned integer value to decrement from the current balance.
101  microcontroller function w/o data (uc). Then the next thirteen bits describe a microcontroller function to perform.
110  microcontroller function with data (uc). Then the next three bits describes the number of data bytes that follow (as n plus one times two). i.e., 000 = two data bytes follow. 001 = four data bytes follow. 111 = sixteen data bytes follow.
111 (reserved)

Agency Codes:

The agency code represents the two bytes transmitted after the record type in the POLL message, and it consists of the MSB byte and the LSB byte. The ASIC 34 will have the ability to store two bytes of user-defined agency code for these comparisons.

For a transponder 14 to immediately respond to a interrogator 12, one of two conditions must be met:

1) the MSB and LSB bytes of the incoming agency code must match the user-defined agency code, or 2) the MSB byte of the incoming agency code must match the user-defined MSB agency code, and the LSB byte must match the internally-defined "group" response code of 0xFF.

As an example, the user-defined agency code in the ASIC might be 0x5061 with the group response code of 0xFF. In this case, for the ASIC to immediately respond, the incoming Agency code would have to be either 0x5061 or 0x50FF. Any other incoming Agency code would not cause the ASIC to respond immediately. If these conditions are not met, a microcontroller message will be generated. The microcontroller will then check its internal list of valid agency codes, and modify the ASIC's 34 user-defined agency code to that of the incoming agency code (if appropriate). After modification of the transponder's 14 user-defined agency code registers and account balance registers, the transponder 14 would be able to respond to the interrogator 12. It is envisioned that the transponder 14 will have the issuing agency's identification programmed into its account number. It will be a lane controller or interrogator's 12 responsibility to verify the true validity of the transponder account for the given situation, and to make the proper transaction.

Preferred Message Structures:

WAKEUP structure:

Length: 10 bits

Sequence: wakeup_modulation (ten manchester-encoded 1's)

POLL structure:

Length: 10.5 bytes

Sequence: header (1.5 bytes)

record_type (2 bytes)

agency_code (2 bytes)

time (2 bytes)

encode_key (1 byte)

CRC (2 bytes)

RESPONSE structure:

Length: 21.5 bytes or 37.5 bytes

Sequence: header (1.5 bytes)

record_type (2 bytes)

memory_block_A (16 bytes)

additional_data (16 bytes) optional CRC (2 bytes)

ACKNOWLEDGE structure:

Length: 19.5 bytes or 35.5 bytes

Sequence: header (1.5 bytes)

record_type (2 bytes)

transponder_ID (6 bytes)

reader_ID (6 bytes)

status_code (2 bytes)

additional_data (16 bytes) optional CRC (2 bytes)

The ASIC 34 typically expects the transaction to be completed in the same cycle (i.e. during the same WAKEUP-POLL-ACKNOWLEDGE sequence). However, if the agency code "silence" period of the POLL message is still in effect, the ASIC will listen to the ACKNOWLEDGE message for a special Type 9 ACKNOWLEDGE message containing it's account number for possible turn-on.

Example Reader-ASIC Message Timing:

(Each Manchester-encoded bit is 3.333 us wide.)

| Period | # Bits/ Min | # Bits/ Max | Time (uS) Min | Time (uS) Max | Open Entry (uS) | Open Exit (uS) | Closed (uS) |
|---|---|---|---|---|---|---|---|
| WAKEUP | 10 | | 33.3 | | 33.3 | 33.3 | 33.3 |
| delay | | | 100 | | 100 | 100 | 100 |
| POLL | 84 | 84 | 280 | 280 | 280 | 280 | 280 |
| delay | | | 10 | | 10 | 10 | 10 |
| Lane_Pulses | | | 10 | | 10 | 10 | 10 |
| delay | | | 80 | | 80 | 80 | 80 |
| RESPONSE | 172 | 300 | 573.3 | 1000 | 573.3 | 1000 | 573.3 |
| delay | | | 100 | | 100 | 100 | 100 |
| ACK | 156 | 284 | 520 | 946.7 | 946.7 | 520 | 520 |
| delay | | | 10 | | 10 | 10 | 10 |
| Total | | | 1716.6 | 2570 | 2143.3 | 2143.3 | 1716.6 |

The timing described hereinabove is merely exemplary. Other timing protocols, procedures and techniques are comprehended by this specification. Various modifications and combinations of the illustrative embodiments, as well as other embodiments of the invention, will be apparent to persons skilled in the art upon reference to the description. It is therefore intended that the appended claims encompass any such modifications or embodiments.

Special Functions

Power-Up Reset:

The digital ASIC 34 contains a power-up reset circuit to properly initialize the circuitry upon connection to a battery. An external reset pin is also provided to allow a manual reset to initiated during maintenance operations/testing. The external reset pin may be grounded to initiate a reset, and this will cause the digital ASIC 34 to lose all previously programmed data and clear all counters and registers.

Battery Consumption Gauge:

The battery consumption for powerup stages 2 and 3 is measured by a special conversion/calculation circuit on the digital ASIC 34. The battery consumption by these two stages are counted in a special register whose two high-order bits are included as part of the FLAGS register. The status of the two (MSB) bits indicate:

00:<174 mAH used
01:174 mAH<—>348 mAH used
10:348 mAH<—>522 mAH used
11:>522 mAH used Buzzer Output:

The preferred embodiment digital ASIC 34 has the ability to drive a piezoelectric transducer to allow audible tones to be generated in response to certain transponder functions. A high beep (1172 hz) might indicate a successful function. A low tone (586 hz) generally might indicate an unsuccessful function. A long tone is approximately ¾ second (872 ms) long, and a short beep is approximately ¼ second (218 ms) long, both with approximately ½ second (436 ms) spacing.

Example Audio Messages:

| Situation | Sound |
| --- | --- |
| Successful Transaction | 3 short high beeps |
| Successful Data Load | 1 short high beep |
| Bad Account Status | 2 long low tones |
| Tollway/account mismatch | 1 long low tone |

Maintenance Mode and Messages

A maintenance mode is provided in which the toll agency or other authorized entity can fixedly store user information into the transponder's memory. This information includes: the type of encryption; whether encryption is used; whether lane discrimination is implemented; the FSK frequencies used; in transit information about the payload, such as weight, value, or toxicity; whether a microprocessor is attached to the transponder 14; the user account #; the amount of money stored on the transponder 14. The transponder does not become activated until an authorized individual puts the transponder into maintenance mode at a programming station by sending an access code. The transponder or transponder 14 may provide a maintenance mode acknowledgement signal to the interrogator 12, the maintenance mode acknowledgement signal for confirming to the interrogator that the transponder is in maintenance mode. The agency then programs the transponder with user information. A change of agency code or the expiration of the 10 second timer will cause the maintenance mode to cease. The following functions are valid only if the maintenance mode is in effect. In maintenance mode, the lane discrimination controller 124 is disabled. The special message formats used for testing of the ASIC in maintenance mode include:

Poll Messages:

Type 1 Maintenance POLL message
The transponder is requested to send memory blocks A and B in the next RESPONSE message.

Type 2 Maintenance POLL message
The transponder is requested to send memory blocks A and C in the next RESPONSE message.

Type 3 Maintenance POLL message
The transponder is requested to send memory blocks A and D in the next RESPONSE message.

Type 4 Maintenance POLL message
The transponder is requested to send memory block A in the next RESPONSE message.

Type 5 Maintenance POLL message
The transponder is requested to send memory block A and the maintenance block.

Type 6 Maintenance POLL message
The battery consumption gauge clock is disconnected, the registers are loaded with test data, the registers are incremented by one clock, and the register values are read out in the RESPONSE message. The original contents must be saved, a new value calculated, and the new value stored into the battery consumption registers before the transponder is put back into operation. The transponder will respond with a Type 2 RESPONSE message.

Type 7 Maintenance POLL message
The transponder is requested to send the entire contents of the RECEIVE buffer. This special POLL message format is used to directly load the RECEIVE buffer with test data. The transponder will respond with a Type 6 RESPONSE message, which will be unencrypted.

Response Messages:

Type 5 Maintenance RESPONSE message
The transponder is responding with memory blocks A and the maintenance block.

Type 6 Maintenance RESPONSE message
The transponder is responding with memory block A and the contents of the RECEIVE buffer. This message is unencrypted, and does not contain the tag's account number. The interrogator will have stored the account number of the tag from a previous POLL/RESPONSE sequence, and will use the account number in the corresponding ACK message for this response.

Acknowledge Messages:

Type 1 Maintenance ACKNOWLEDGE message
No operation is performed. The status code is ignored.

Type 2 Maintenance ACKNOWLEDGE message
The message following the status code is to be loaded into memory block D. The status code is ignored.

Type 3 Maintenance ACKNOWLEDGE message
The message following the status code is to be loaded into memory block C. The status code is ignored.

Type 4 Maintenance ACKNOWLEDGE message
The message following the status code is to be loaded into memory block B. The status code is ignored.

Type 5 Maintenance ACKNOWLEDGE message
The message following the status code is to be loaded into memory block A. The status code is ignored.

Type 6 Maintenance ACKNOWLEDGE message
This indicates that the message following the status code are written into the maintenance registers. The status code is ignored.

Type 7 Maintenance ACKNOWLEDGE message
This indicates that the status code and the message following the status code are written to the microcontroller. The status code indicates the nature of the instruction.

Type 8 Maintenance ACKNOWLEDGE message
The bounce bit is reset. No other operation is performed. The status code is ignored.

Low Frequency Modulated Interrogator

Figure 18:
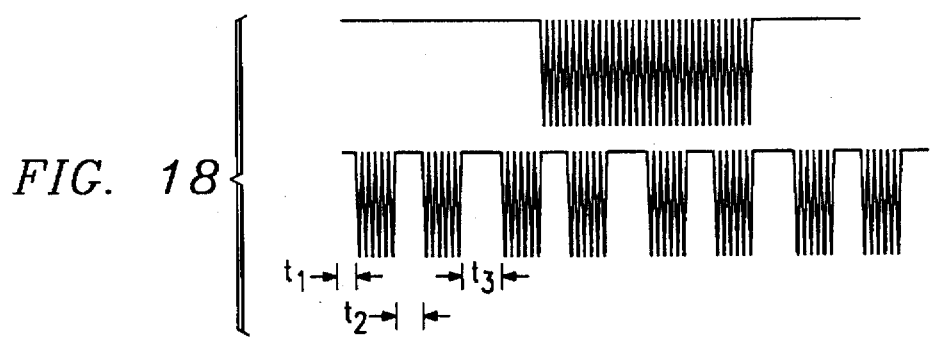
FIG. 18 illustrate waveform graphs for two different embodiments of "squirter" modulation by which low frequency signalling from the interrogator of FIGS. 1–4 can be superimposed upon an RF interrogation signal.

Another embodiment interrogator is shown in FIG. 18. This configuration may be used to lower power consumption of the transponder by using a low frequency modulation superimposed on the normal RF interrogations. By using this low frequency modulation, it is possible to construct the field detector or wake-up circuit 64 to be sensitive to a very low modulation frequency such as 90 Hz instead of the normal communication modulation frequency. The interrogator 12 superimposes this low frequency modulation conceptually by a heterodyne or mixer 222 as shown in FIG. 18. The actual superimposition of this low frequency modulation could be using post-processing of the RF interrogation signal, such as the mixer 222 as shown in FIG. 18. Alternatively, the superimposition could be integrated into the generation of the RF interrogation signal, such as by using a technique called "squitter" modulation. This is a technique by which a high data rate signal can be made to contain low frequency components for signal sensing purposes. The data transmissions are thus sent in bursts having a burst rate equal to the low frequency signal to be detected. For example to achieve a 100 Hz low frequency (LF) component, data may be sent for 5 ms then remain in an known state (high or low) for another 5 ms. Then further data would be sent for another 5 ms followed by another 5 ms of "no data". Such a pattern is continuously repeated, creating a spectral line at 100 Hz that may be detected by a simple low pass filter 74 which passes 100 Hz and rejects the higher frequency signals. This squirter modulation technique would preferably be implemented in the software resident in the host 16, the transmitter 52, or the interface circuit 56. Alternative transmission formats instead of the square wave gating function described above are possible. The square wave gating function has periods of "transmit" alternated with "no transmit" (such that the transmission rate modulates between 0% and 100% of the maximum). The length of the data "no transmit" period can be increased in a linear manner from a minimum period to a maximum period. This would be a triangular data rate modulation in which the burst rate would change in time from a lower (higher) rate such as 100 hz, as described previously, to a higher (lower) rate such as 300 hz. Such modulation would provide additional means for a receiver to recognize an interrogator signal and exclude interference sources. Other secondary modulation waveforms such as a sine wave could be utilized in this application. The motivations for using a LF modulation as the field detection signal include, as previously mentioned, a savings in power consumption. To build a sensitive field detector or wake-up circuit 64, amplifications of the received signal must occur after detection. If the amplification is to the DC detected level, no immunity is provided to interference from external sources such as cellular phones, lightning, electric fences and other sources. Detecting a high speed modulation frequency draws a greater amount of power than might otherwise be required. The amplifier's power consumption is nearly linear with frequency, so it is important to lower the frequency the amplifier detects insofar as possible.

Alternative Wake-Up Function:

An alternative wake-up method and structure will now be described with respect to FIG. 19. The alternative preferred embodiment transponder will have a multi-state wake-up by which a low power stage 1 threshold detector 62 will wait for the received field strength to be greater than 500 mV/m2. Upon reception of a field strength in excess of the threshold, the stage 1 threshold detector 62 will enable the stage 2 wake-up circuit 64 to awaken and monitor the received signal for a pre-selected modulation. If the stage 2 wake-up circuit 64 receives the prescribed modulation signal, the wake-up circuit 64 will then turn on the digital ASIC 34 via switch 98. In this manner, minimum power is consumed because the stage 1 threshold detector 62 consumes but a small amount of power although it is always in a powered condition. The wake-up circuit 64 consumes a slightly greater amount of power, but is essentially a low-power device. The wake-up circuit 64 further is only component enabled during the normally small amount of time during which the received power is greater than the threshold. Finally, if both the threshold condition and the modulation condition are satisfied, only then is power applied to the higher power consumption digital ASIC 34. The interrogator 12 then transmits a interrogation signal to the remote transponder 14, the interrogation signal preferably being transmitted using On-Off Keying. Upon completion of the interrogation signal, the transmitter 52 then transmits a continuous wave RF signal onto the transponder 14 so the transponder 14 may backscatter modulate the continuous wave RF signal to generate the response signal. The interrogator 12 will now be described. The interrogator 12 is located at a data exchange location such as a bridge, toll plaza, or designated point of interest. The system includes a common reference oscillator 50 which generates at its output 51 a reference carrier wave for synchronization of the interrogators 12. Each interrogator 12 has a directional antenna 18 and a transmitter 52 which transmits a trigger signal 42 of sufficient field strength and/or modulation type at a pre-selected distance to trigger or activate a transponder 14 being carried in a vehicle 26 in the interrogator's associated vehicle lane 28a,28b,28c. The interrogator 12 further includes a receiver 54 for reception of the response signal and for separation of the response signal from spurious non-modulated reflections. The interrogator transmitter 52 and receiver 54 operate under control of a control interface circuit 56. The host 16 by way of the control interface circuit 56 directs the transmitter 52 to send the trigger signal 42, followed by the interrogation signal.

Figure 19:
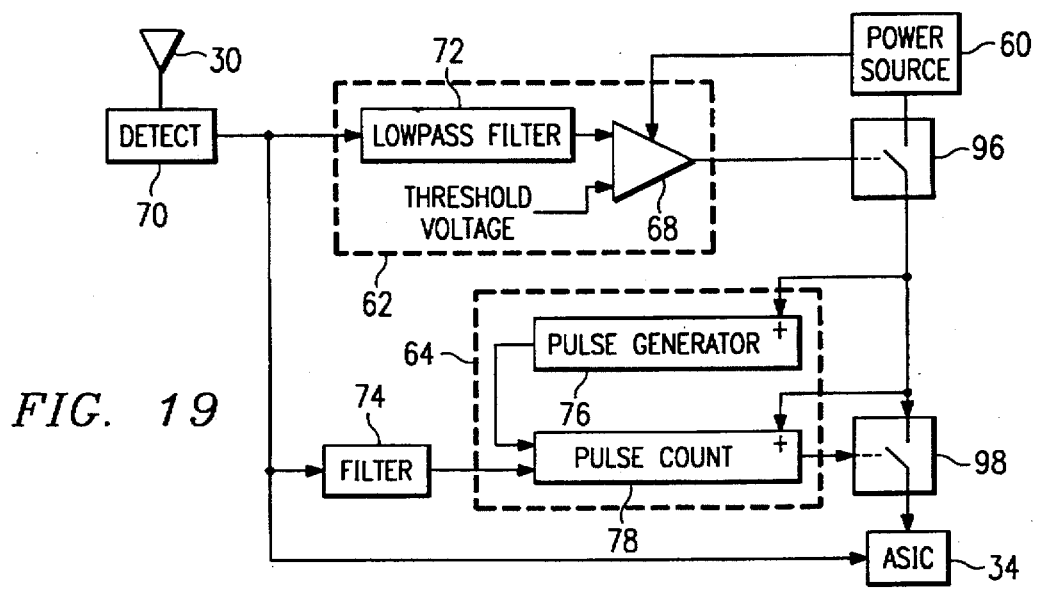
FIG. 19 is a block circuit diagram of a transponder which also includes an RF threshold detector.

Wake Up Block:

With reference to FIG. 19, a more detailed diagram is shown of the multistate wake-up circuitry 60. The first stage circuitry 62 and second stage wake-up circuitry 64 is preferably implemented in the analog ASIC 32. The inventive concepts described herein have significant advantages over the prior art in terms of power consumption. It is of significant importance to design a toll tag or transponder 14 that has an exceptionally long battery life. By implementing the inventive concepts described herein, the transponder 14 will normally be in a sleep mode or STATE 1, drawing little energy from the battery 66. The only energy consumed in this first state will be that required by the first stage circuitry 62. First stage circuitry 62 normally comprises a DC threshold comparator 68, which receives the signal from the antenna 30 via the detector 70. Firstly, a detector 70 is operable to extract a 300 kbps Manchester II signal at node "A" that has been modulated onto a 915 MHz continuous wave RF signal. Since the first stage circuitry 62 needs only to detect a certain RF energy level, a lowpass filter 72 is provided between the detector 70 and the comparator 68. Lowpass filter 72 outputs a DC level signal at node "B" related to the average received voltage level at node "A." Since the DC threshold comparator 68 is in an essentially static condition, the power consumed thereby is very low. When the DC level signal at node "B" exceeds a certain pre-determined voltage threshold, the comparator 68 by its output at node "C" enables the wake-up 64 to monitor the received signal for the presence of the 300 kbps modulation and the transponder 14 thus enters STATE 2.

With further reference to FIG. 19, a high pass filter 74 is provided at the output of the detector 70 to filter out any spurious low frequency signals such as that from cellular phones or other sources. The high pass filtered signal is provided from the filter 74 at node "D." The filter 74 may alternatively be a band pass filter. Upon detection of an RF field of sufficient strength, the comparator 68 enables the oscillator or pulse generator 76 and a modulation detector 78, which is preferably a pulse counter. The wake-up circuitry 60 supplies power to the digital ASIC 34 to enter STATE 3 only upon detection of a sufficient RF signal energy and a modulation at a pre-determined frequency in order to maintain the minimum power consumption. In a first preferred embodiment, the expected modulation frequency will be the high-speed modulation of 248 KHz or more. In another preferred embodiment, a low frequency signal of approximately 90 Hz is superimposed upon the 915 MHz carrier.

Still referring to FIG. 19, the demodulated signal from the transponder detector 70 becomes one input of the analog voltage comparator 68 called the signal level flag. The threshold level is determined by a 3 bit DAC (not shown). A pulse generator 76, preferably a crystal oscillator, RC oscillator, or ceramic resonator is enabled and a pulse counter 78 is loaded with a count corresponding to a pre-determined duration. Each pulse of RF signal level raising the voltage at node "B" over the threshold causes the pulse counter 78 to be re-started, keeping the pulse generator 76 running until the pre-determined duration has expired. The pre-determined duration of the pulse counter is selected based upon the time between RF interrogation pulses from the interrogator 12. For example, an interrogator may send RF interrogation pulses every 2 ms, and the short absences of signal due to any On-Off Keying (OOK) of the carrier or other shod, intra-message absences will be typically much less than 2 ms. Thus, the pre-determined duration will be slightly less than 2 ms but greater than the intra-message absences in order to keep the digital ASIC 34 enabled for an entire message from the interrogator.

As mentioned, the signal level flag from the comparator 68 activates the wake-up circuit 64. For the first preferred embodiment the pulse counter 78 is preferably a gated 4 bit counter circuit. The gate is set at 62.5 us, meaning that the 4 bit counter overflows if a 248 kHz or greater modulation is present. To further save power, the wake-up circuit 64 has its power duty-cycled. Every 16 ms, a 2 ms window is opened (⅛ duty cycle), and within the 2 ms window the detector is on for 62.5 us and off for 125 us (⅓ duty cycle). This duty-cycling (⅛×⅓=1/24 duty cycle) effectively reduces the power consumption to 1/24th of the original value.

Still referring to FIG. 19, if no modulation is detected and the RF signal drops below the threshold voltage, the wakeup block 60 will automatically power down a short time later. If no wakeup modulation is detected and the RF signal maintains above the threshold, the wake-up circuit 64 will preferably continue to consume power. If modulation is detected, the majority of the digital ASIC 34 is activated and the pulse counter 78 is kept active by a signal from the main controller block 80 (see FIG. 11) of the digital ASIC 34. If the RF signal disappears, the main controller block 80 may keep the pulse generator 76 active until the digital ASIC 34 functions are completed. The main controller 80 will not stop the pulse generator 76 until all pending functions are completed. The pulse generator 76 would preferably stop a short time after the main controller 80 signaled a power-down. Preferably, the transponder 14 will now enter a STATE 4 wherein all circuitry is essentially dormant for a fixed period of time so that the transponder 14 will not be again activated by the same modulation. After this fixed period of time, the transponder 14 again enters STATE 1 so that it is able to receive interrogation signals from other interrogators 10.

Additional capabilities envisioned include, but are not limited to, EEPROM memory, LCD drive capability with push button selection, serial communications, and piezo-electric buzzer drive.

The sole table below comprises the terms used in this patent application, including some alternate and preferred terms. Other terms may be used which are not listed in the sole table.

TABLE

| Drawing Element | Generic Term | Preferred or Specific Term | Alternate Terms |
|---|---|---|---|
| 10 | Vehicle Identification System | Automatic Vehicle Identification System | AVI System |
| 12 | Interrogator | Interrogator | Reader |
| 14 | Transponder | Transponder | Responder, Tag |
| 16 | Host | Host | Toll Booth Computer, Toll Plaza Computer |
| 18 | Antenna | Directional Antenna | Interrogator Antenna |
| 20 | Electronics Module | Interrogator Electronics Module | |
| 22 | Interconnect | RF Interconnect | RF coax, Coaxial Cable |
| 24 | Connection | Host Connection | RS232 Connection, RS422 Connection, Host Connection |
| 26 | Vehicle | Vehicle | Automobile |
| 28 | Lane | Vehicle Lane | |
| 30 | Antenna | Transponder Antenna | transponder Antenna, Responder Antenna |
| 31 | Integrated Antenna | Integrated Transponder Antenna | Integrated Transponder Reflector/Antenna |
| 32 | Control Circuit | Analog ASIC | Analog/Digital ASIC |
| 34 | Control Circuit | Digital ASIC | Digital Processing Section |
| 36 | Receive Buffer Block | | |
| 38 | Main Controller Block | | |
| 40 | Transmit Block | | |
| 41 | Reflector | Modulated Reflector | |
| 42 | Wake-up Burst | Trigger signal | Activation Signal |
| 44 | Field Strength Pulse | Field Strength Pulse | |
| 45 | Lane Discrimination Period | First Lane Discrimination Period | |
| 46 | Lane Discrimination Period | Second Lane Discrimination Period | |
| 47 | Lane Discrimination Period | Third Lane Discrimination Period | |
| 48 | Memory | Transponder Memory | |
| 50 | Reference Oscillator | Toll Plaza Reference Oscillator | Reference Generator |
| 51 | Output | Output of Toll Plaza Reference Osc | |
| 52 | Transmitter | Transmitter | Illuminator Transmitter, Transmitter Module |
| 54 | Receiver | Receiver | Receiver Module, Demodulator |
| 56 | Control Circuit | Interface Circuit | Computer Interface |
| 60 | Wake-Up Block | Multi-Stage Wake-up Circuitry | |
| 62 | First Stage Circuitry | Threshold Detector | |
| 64 | Second Stage Circuitry | Wake-up Circuit | Modulation Detector |
| 66 | Power Source | Battery | |
| 70 | Detector | | |
| 72 | Filter | Low Pass Filter | |
| 74 | Filter | High Pass Filter | |
| 76 | Pulse Generator | | |
| 78 | Counter | Pulse Counter | |
| 80 | Main Controller Block | | |
| 82 | Rectifier | Diode | |

TABLE-continued

| Drawing Element | Generic Term | Preferred or Specific Term | Alternate Terms |
|---|---|---|---|
| 84 | Capacitor | Shunt Capacitor | |
| 86 | Resistor | Shunt Resistor | |
| 88 | Capacitor | Series Capacitor | |
| 90 | Resistor | Shunt resistor | |
| 92 | Comparator | Gated Comparator | |
| 94 | Terminal Count Pin | | |
| 96 | Latch | Gated Latch | |
| 97 | OR gate | | |
| 98 | Switch | Power Switch | |
| 100 | Receive Buffer Block | | |
| 102 | Manchester Decoder | | |
| 104 | Main Controller | | |
| 106 | CRC Generator | | |
| 108 | Lane Discrimination Circuit | | |
| 110 | Receiver State Controller | | |
| 112 | Shift Register | Serial-to-Parallel Shift Register | |
| 114 | Counter | Byte Counter | |
| 116 | Register | Holding Register | Latch |
| 118 | SRAM | SRAM | Latch |
| 120 | Comparator | Address Comparator | |
| 122 | Buffer | Receive Buffer | |
| 124 | Controller | Lane Discrimination Controller | |
| 126 | Capacitor | Sample and Hold Capacitor | |
| 130 | Comparator & Decoder | | |
| 132,134 | Switch | Sample and Hold Switches | |
| 137 | Timer | Short Timer | |
| 138 | Timer | Long Timer | |
| 140 | Main Controller Block | | |
| 142 | Comparator | | |
| 146 | Counter | Transaction Counter | |
| 148 | Main Memory Block | | |
| 150 | Memory | Main Memory | |
| 152,154 | Address Selection Circuit | Multiplexer | Mux |
| 156 | Response Selection Circuit | Multiplexer | Mux |
| 158 | Register | Byte Register | |
| 160 | Encryptor | Encryptor | Encryption Circuit |
| 162 | CRC Generator | | |
| 164 | Header Generator | | |
| 166 | Modulator | | |
| 168 | Controller | Transmitter Controller | |
| 170 | Clock Circuit | | |
| 172 | External Interface Circuit | External I/F | |
| 174 | Controller | Secondary Controller | Interface Controller, IF Controller |
| 176 | Bit Counter | | |
| 178 | I/O Buffer | | |
| 180 | Data Out Select | Data Out Mux | |
| 182 | Clock Select | Clock Select Mux | |
| 184 | Counter | 138 bit counter | |
| 186 | Counter | 8 bit counter | |
| 190 | Buzzer Block | | |
| 192 | Controller | Buzzer Controller | |
| 194,196, 198,200, 202 | Divider | Tone Divider | Clock Divider |
| 204,206 | AND | | |
| 208 | OR | | |
| 210 | Buffer | | |
| 212 | Buzzer | | Speaker, Piezo |
| 214 | Clock | Main Oscillator | Main Clock |
| 216,218, 220 | Divider | Clock Divider | |
| 222 | Modulator | Mixer | |

A few preferred embodiments have been described in detailed hereinabove. It is to be understood that the scope of the invention also comprehends embodiments different from those described, yet within the scope of the claims.

For example, display devices can be cathode ray tubes or other raster-scanned devices, liquid crystal displays, or plasma displays. "Microcomputer" in some contexts is used to mean that microcomputer requires a memory and "microprocessor" does not. The usage herein is that these terms can also be synonymous and refer to equivalent things. The terms "controller," "processing circuitry," and "control circuitry" comprehend ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Frequency shift keyed (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. Modulation might be effected by back-scatter modulation, by active modulation of a carrier, or by another method. Discrete components or fully integrated circuits in silicon (Si), gallium arsenide (GaAs), or other electronic materials families, as well as in optical-based or other technology-based forms and embodiments might be used to implement the circuits described herein. It should be understood that various embodiments of the invention can employ or be embodied in hardware, software or microcoded firmware.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of accessing restricted addresses within a transponder, the method comprising the steps of sending an access code from said interrogator to said transponder, said access code enabling access to pre-determined addresses within the transponder's memory, thereby entering a transponder maintenance mode; and transmitting an interrogation message comprising a special instruction from said interrogator to said transponder, said special instruction valid only during said maintenance mode.

2. The method of claim 1 and further comprising the step of providing a maintenance mode acknowledgement signal from said transponder to said interrogator, said maintenance mode acknowledgement signal confirming to said interrogator that said transponder is in maintenance mode.

3. The method of claim 1 and further comprising the step of sending a response message from said transponder to said interrogator in response to said special instruction therefrom.

4. The method of claim 3 wherein said special instruction specifies that said transponder is to transmit the contents of selected transponder memory blocks in said response message.

5. The method of claim 1 wherein said special instruction is a test instruction that instructs the transponder to perform a test routine.

6. The method of claim 5 wherein said transponder in response to said test instruction loads a register with test data, increments the register, and transmits the new contents of the register in said response message.

7. The method of claim 3 wherein said special instruction specifies that said transponder transmit contents of its receive buffer in said response message.

8. The method of claim 1 and further comprising the step of disabling the maintenance mode upon the expiration of a maintenance mode timer.

9. The method of claim 1 and further comprising the step of disabling the maintenance mode upon the transmission of a new agency code to said transponder.

10. A method of testing a transponder, the method comprising the steps of sending an access code from said interrogator to said transponder, said access code enabling said transponder to perform a test routine wherein said transponder in response to a test instruction loads a register with test data, increments the register, and transmits the new contents of the register in a response message.

11. A recognition system having an interrogator that is selectively operable to transmit first signals, wherein said first signals include an access code, and a transponder operable to receive said first signals including said access code and to perform test operations upon receipt of said access code, said test operations not normally available to be performed without receipt of said access code, said recognition system comprising:

a) a transponder receiver, said transponder receiver operable to receive first signals including said access code and, following said access code, a test instruction from said interrogator;

b) a transponder controller within said transponder, said transponder controller operable to receive said access code, to compare said access code to a security code stored in said transponder, and should said access code be a pre-determined relationship to said security code, to receive said test instruction, said transponder controller further operable to perform otherwise unpermitted actions in response to said special instructions.

12. The system of claim 11 and further comprising a register, and wherein said otherwise unpermitted actions include a test routine wherein said transponder controller loads said register with test data, increments the register, and transmits the new contents of the register in a response message to said interrogator.

* * * * *